United States Patent [19]

Crookshanks

[11] Patent Number: 4,991,127
[45] Date of Patent: Feb. 5, 1991

[54] OFFSET AND GAIN CORRECTION SYSTEM FOR IMAGE DATA PROCESSING

[75] Inventor: Rex J. Crookshanks, Palos Verdes Estates, Calif.

[73] Assignee: Hughes Aircraft Company, Los Angeles, Calif.

[21] Appl. No.: 316,345

[22] Filed: Feb. 27, 1989

Related U.S. Application Data

[63] Continuation-in-part of Ser. No. 901,115, Aug. 28, 1986, Pat. No. 4,809,194.

[51] Int. Cl.⁵ .................. G06F 15/66; G06F 15/68
[52] U.S. Cl. ..................... 364/571.04; 358/213.28; 364/518
[58] Field of Search ................ 364/518–521, 364/571.04, 713; 358/213.28, 446, 464–466; 382/41

[56] References Cited

U.S. PATENT DOCUMENTS

| | | | |
|---|---|---|---|
| 4,216,503 | 8/1980 | Wiggins | 358/446 |
| 4,413,287 | 11/1983 | Torpie et al. | 358/464 |
| 4,525,741 | 6/1985 | Chahal et al. | 358/446 |
| 4,660,082 | 4/1987 | Tomohisa et al. | 358/213.28 |
| 4,669,052 | 5/1987 | Bianco | 364/571.04 |
| 4,744,657 | 5/1988 | Aralis et al. | 364/571.04 |

OTHER PUBLICATIONS

Streuber et al: Imaging Charge-Coupled Devices for Deep-Space Surveillance, Proceedings Society Photo-Optical Instrum. Engineering, SPIE, vol. 252, pp. 34–43 in 358–109, 1980.

*Primary Examiner*—Felix D. Gruber
*Attorney, Agent, or Firm*—William J. Streeter; Wanda K. Denson-Low

[57] ABSTRACT

An image processing system (10) includes a focal plane array (652) of image detectors (654), each of which produces a signal proportional to incident radiation. The image data signals are arranged in groups, such as rows or columns that are respectively associated with a plurality of select circuits (656) which sequentially select the signals for correction by an associated offset and gain correction circuit (658). The correction circuit includes a pair of shift registers (672, 694) for respectively storing data related to a desired gain correction and offset correction of the data image signal. Under control of a processor, the stored correction data is used to pass the image data signal through a selectively configured network of resistive elements (720, 722) to thereby correct the gain and offset of the signal.

17 Claims, 15 Drawing Sheets

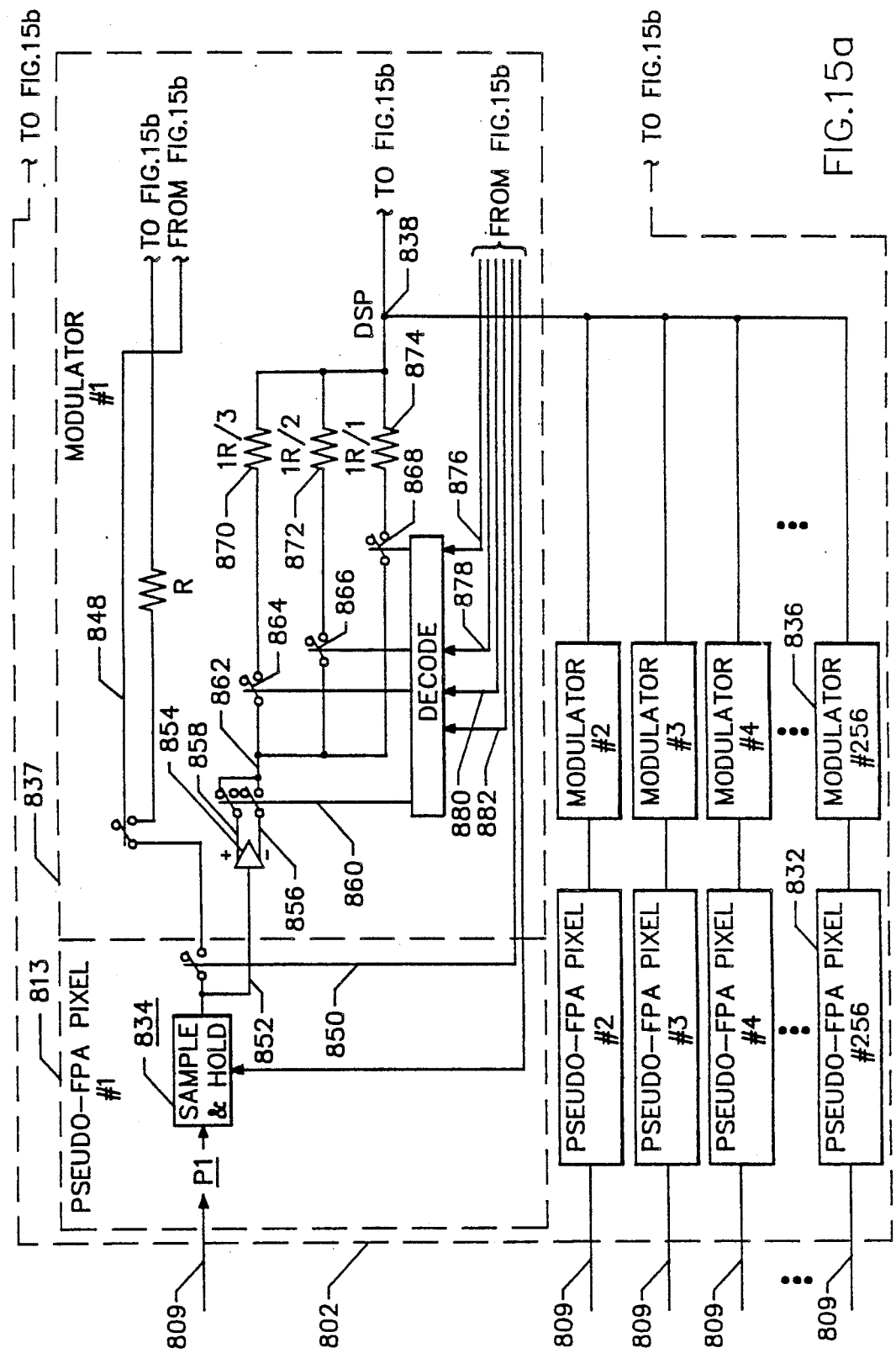

OFFSET AND GAIN CORRECTION SYSTEM FOR IMAGE DATA PROCESSING

RELATED APPLICATIONS

This application is a continuation-in-part of U.S. patent application Ser. No. 901,115 filed Aug. 28, 1986 now U.S. Pat. No. 4,809,194.

BACKGROUND OF THE INVENTION

The present invention relates to image processing, and more particularly to a system for correcting the values of signals representing image data.

Image processing systems are often called upon to process and alter a large amount of information corresponding to image data produced by an array of image sensors or detectors, often referred to as "pixels." The detectors may be of various types and are typically discrete photo responsive elements whose individual characteristics may vary from one pixel to another because of manufacturing or material variations. As a result, pixels within the same array often have different levels of responses to the same value of incident radiation. This results in undesired variations in pixel intensity, and thus distortion to some extent in the resulting image that is recorded. There is therefore a need in the art to correct the image data signals so as to effectively normalize them relative to a common reference value.

The problem of correcting image data signals is exacerbated in very large image arrays, because of the large amount of image data that must be processed and the time restraints for carrying out the processing. It is therefore an object of the present invention to provide offset and gain correction of image data signals, particularly those produced in large image arrays.

SUMMARY OF THE INVENTION

According to the present invention, a system is provided for correcting the values of image data signals relative to a reference value, where the image signals are processed in a system which includes an array of image sensors each producing a signal representing image data and a processor for processing the array of image data produced by the sensors. The correction system includes a plurality of selection means each operative for selecting signals corresponding to a portion of the array of image data, and a plurality of individual signal correction means each operative for correcting the values signals corresponding to the portion of the image array data. Each of the selection means is controlled by the processor to sequentially select signals on a plurality of its inputs and transfer these signals to an output connected with the signal correction means. In a preferred embodiment, each selection means selects data signals from an aligned array of pixels, such as a column or row.

Each of the correction means includes storage means for storing data representing a plurality of correction values, and means responsive to the processor for altering the values of the image data signals in accordance with the stored data. A pair of storage registers respectively store multibit information corresponding to a desired gain correction and a desired offset correction. This stored data is used to switch the incoming image data signals through resistive networks in order to alter the voltage of these signals, and thereby correct them for gain and offset.

BRIEF DESCRIPTION OF THE DRAWINGS

FIGS. 15a and 15b are a combined block and schematic diagram of the modulator detector output of FIG. 13.

DESCRIPTION OF THE PREFERRED EMBODIMENTS

Figure 1:
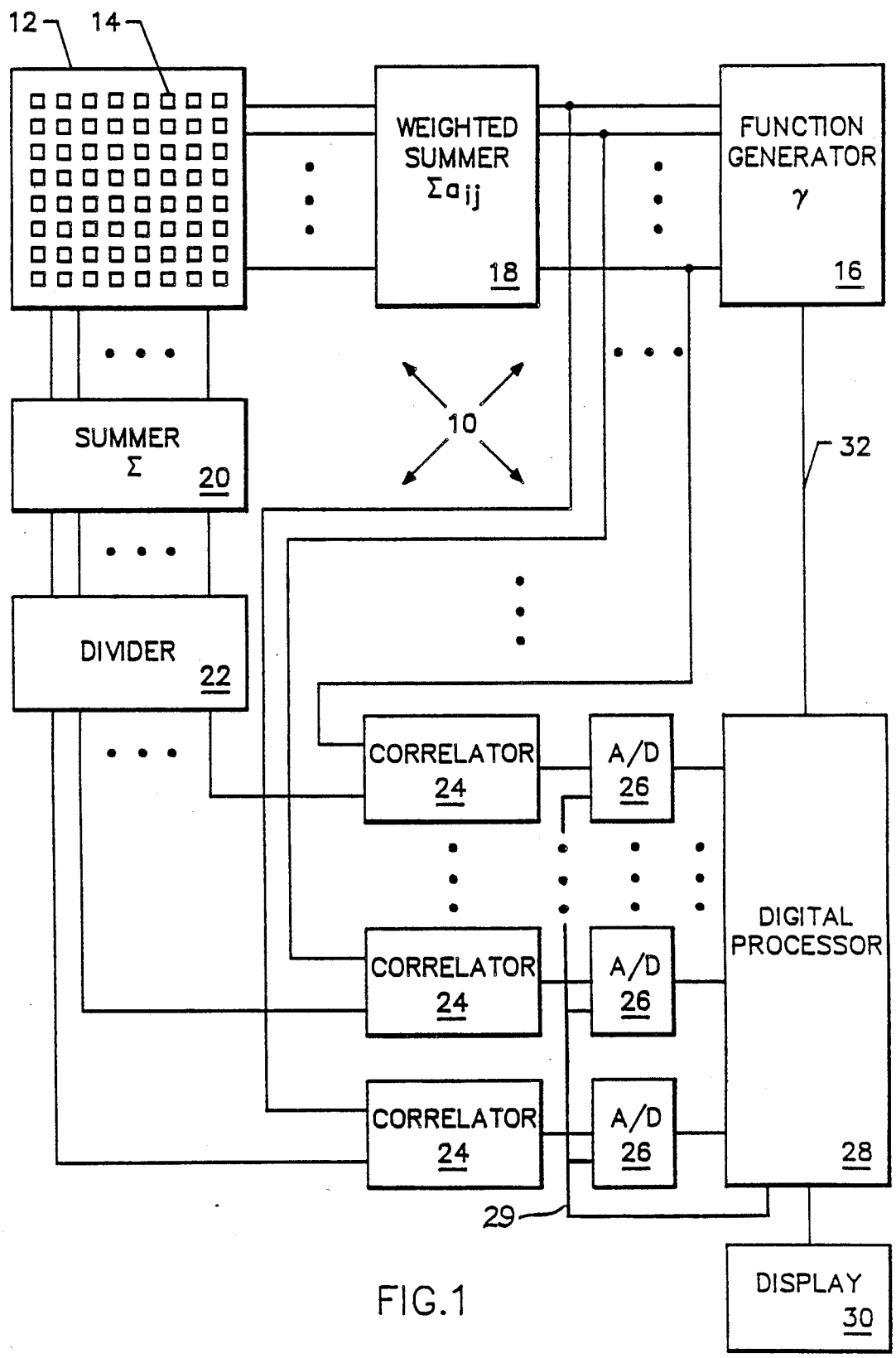
FIG. 1 is a block diagram of a signal detection and processing system in accordance with the present invention.

A signal processing system 10 includes a detector array 12 comprising a multitude of detectors or pixels 14, as shown in FIG. 1. The array 12 can be a superelement or "superpixel" of a much larger array, similar superelements being processed sequentially in the manner described below with respect to array 12. Each detector 14 provides an output as a function of the detected value of a variable referable to an event of interest. For example, the signal processing system can be an image processor and the detectors can be photodiodes which output current as a function of the intensity of incident radiation. The pattern of radiation incident to the array 12 can indicate the source of a radiative event such as a rocket launching.

The signal processing system 10 includes a function generator 16 for generating a set of time functions. In the illustrated system 10, these functions are orthogonal over a predetermined time interval which is short relative to the duration of events to be detected using the array 12. Preferably, the time functions are Walsh functions or an alternative set of functions orthonormal over the predetermined time interval.

A weighted summer 18 accepts as input the orthogonal time functions provided by the function generator and in turn produces a set of modulation functions in the form of weighted sums of the time functions. Preferably, the weights applied by summer 18 define an invertible matrix. For complete decoding, the matrix can be a square $N \times N$ matrix, where N is the number of detectors in the array 12 and the number of functions $\gamma_i$ provided by function generator 16.

The array 12 is designed to apply the modulation functions supplied by the weighted summer 18 to each of the detectors 14. For complete decodability, the array 12 can provide that the output of each detector 14 is modulated by a distinct modulation function. For some applications, alternative arrangements can be implemented efficiently. For example, each row of detectors 14 of array 12 can be assigned a distinct modulation function. In such an embodiment, the array 12 can be arranged so that the output of each detector 14 is modulated by the sum of the respective row and column modulation functions. Many alternative modulation function-to-detector mapping schemes are also provided for by the present invention.

A current summer 20 or alternative signal combining or multiplexing means is provided to combine the outputs of the detectors 14. Directly or indirectly, the output of the summer 20 is replicated over multiple channels by a signal divider 22 or related means.

The parallel outputs of the divider are directed to correlators 24. Each correlator 24 correlates a divider output with a respective one of the time functions $\gamma_i$ provided by the function generator 16. The correlators have the effect of isolating components of the summed signal according to respective time functions $\gamma_i$.

The correlator outputs can then be converted to digital form by analog-to-digital converters 26. The converters 26 form part of a means of sampling the output of correlators 24 over an interval of time over which the time-varying functions are orthogonal. The sampling of the converters 26 can be synchronized over the predetermined interval of orthogonality for the time functions. This synchronization may be accomplished using any well-known technique such as by sending appropriate control signals to the A/D converters 26 from the processor 28 over lines 29. The digitized correlator outputs can then be processed to obtain information as to the spatial variable of interest. In an embodiment providing for complete decoding, a matrix inversion can yield a complete spatial distribution. In other cases, more limited information can be obtained by pair-wise dividing selected correlator outputs.

In the presently described embodiment 10, both complete and partial decoding are provided for. The partial decoding, which is relatively rapid, identifies which detector has detected a change in the value of the incident variable when only one detector has detected such a change. The information, such as images, can be directed to a display 30 or other readout device.

Provision is made for the digital processor 28 to control the time function generator 16 via line 32. This line 32 can be used to switch certain time functions on and off, for example, to allow more complete decoding by successive samplings in cases where multiple detectors are excited concurrently.

Figure 2:
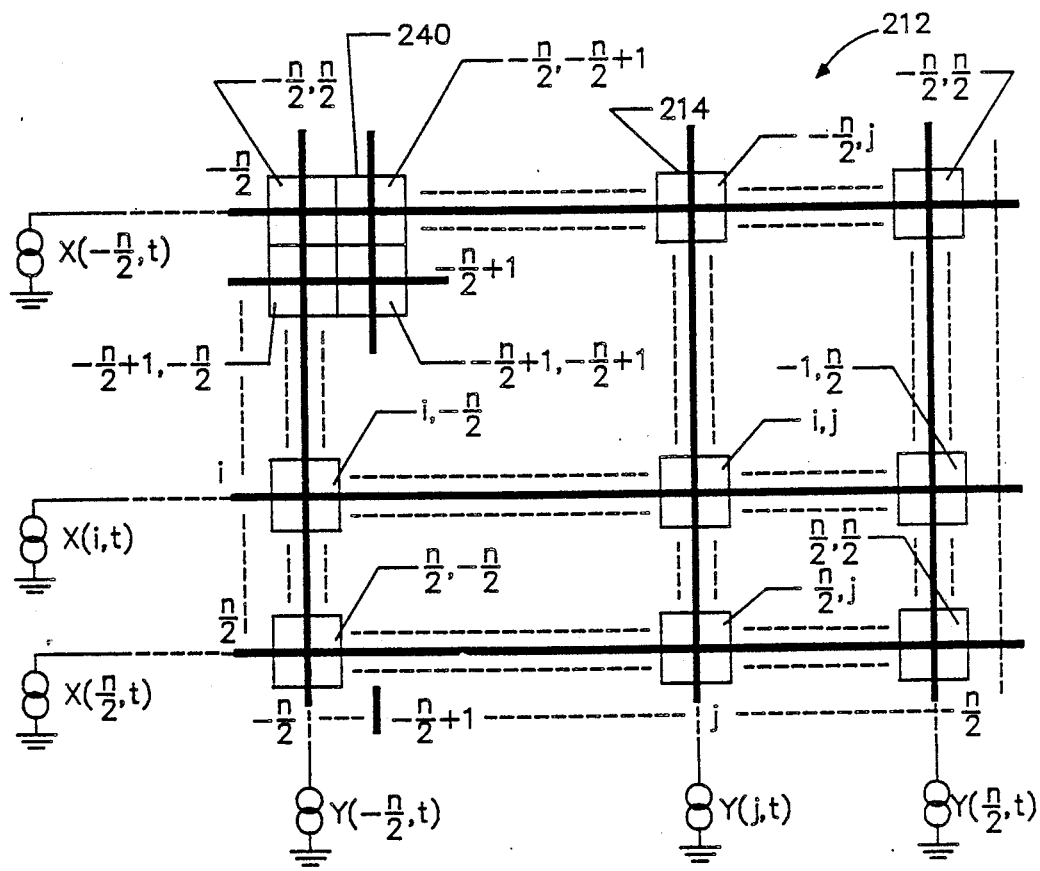
FIG. 2 is a schematic representation of a photodiode array in accordance with the present invention.
Figure 3:
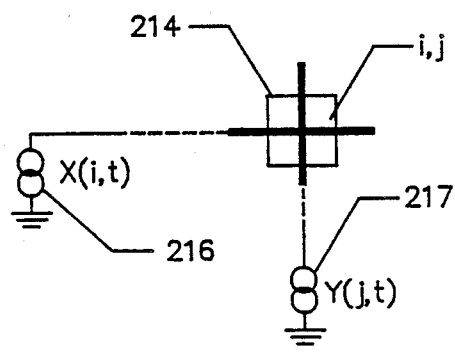
FIG. 3 is a schematic of a modulation scheme for the diodes of the array of FIG. 2.
Figure 4:
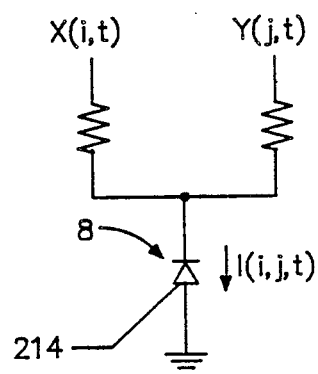
FIG. 4 is an alternative schematic of the modulation scheme shown in FIG. 3.

In the embodiment illustrated in FIG. 2, an imaging array 212 comprises a rectangular or square array of photodiodes. The effective gain of each diode 214 in the array can be controlled as a function of the bias voltage applied by voltage function generators 216 and 217, as shown in FIGS. 3 and 4. As an exemplary alternative, one could use a variably reflective surface such as a liquid crystal shutter to modulate the light intensity before its incidence on the array.

For the configuration of FIG. 2, the current in a diode 214 can be approximately characterized as:

$$i = K_0 + K_1 v q + F(v,q)$$

where i is the current, $K_0$ and $K_1$ are constants, v is the bias voltage, q the intensity of light incident the particular diode, (see FIGS. 3 and 4) and f(v,q) comprises higher order terms in v, q or the combination.

The array 212 is subdivided into sub-arrays or superelements (superpixels) 240 which are sampled sequentially. In the embodiment of FIG. 2, each superelement 240 is constructed as an N x N array of pixels or photodiodes. In this case, N is even, so that i and j take on the values of $-\frac{1}{2}(n), \ldots, -1, 1, \ldots \frac{1}{2}(n)$. As indicated in FIGS. 3 and 4, generated voltage functions X(i,t) and Y(j,t) are summed at the diode at the intersection of row i and column j of array superelement 240. The resultant output current is then a function I(i,j,t) of row, column and time. Proper selection of diodes and pre-distortion of X(i,t) and Y(j,t) are used to minimize the effect of f(X+Y,q). Thus, $$\begin{aligned} I(i,j,t) &= K_0 + K_1 \cdot q(i,j) \cdot [X(i,t) + Y(j,t)] + \\ &\quad f(X(i,t) + Y(j,t), q(i,j)) \\ &\approx K_0 + K_1 \cdot q(i,j) \cdot [X(i,t) + Y(j,t)] \end{aligned}$$

Voltage biases X and Y are applied in parallel to all superelements that go to make up the total array, and N is in the range of from 8 to 100.

The bias voltages X and Y are selected so that:

$$X(i,t) = \sum_{k=0}^{K} A_k \cdot \alpha_k(i,t)$$

$$Y(j,t) = \sum_{l=0}^{L} B_k \cdot \beta_l(j,t)$$

where $\alpha_k(i,t_0)$ satisfies orthogonality with respect to k over i for a fixed $t_0$, and $\beta_1(j,t_0)$ satisfies orthogonality with respect to 1 over j for a fixed $t_0$. Also, $\alpha_k(i,t)$ and $\beta(j,t)$ satisfy orthogonality over a fixed interval of time T, for fixed $i_0$ and $j_0$, and orthogonality with respect to k and 1, respectively, so that one can form:

$$\alpha_k(i,t) = \Phi_k(i) \cdot \gamma_{k+1}(t)$$

$$\beta_1(j,t) = \theta_k(i) \cdot \gamma_{k+1+2}(t)$$

and make the substitution $$\Phi_k(i) = \theta_k(i).$$

Thus, $$\alpha_k(i,t) = \Phi_k(i) \cdot \gamma_{k+1}(t)$$

$$\beta_1(j,t) = \Phi_1(i) \cdot \gamma_{k+1}(t)$$

where, $$\sum_{i=-N/2}^{N/2} \phi_m(i) \cdot \phi_n(i) = \begin{cases} \text{constant}, & m = n \\ 0, & m \neq n \end{cases}$$

and, $$\int_0^t \gamma_m(t) \cdot \gamma_n(t) dt = \begin{cases} \text{constant}, & m = n \\ 0, & m \neq n \end{cases}$$

and where, $$\int_0^t \gamma_0(t) dt = \text{constant}$$

and $$\int_0^t \gamma_m(t) dt = 0, \, m > 0$$

Figure 5:
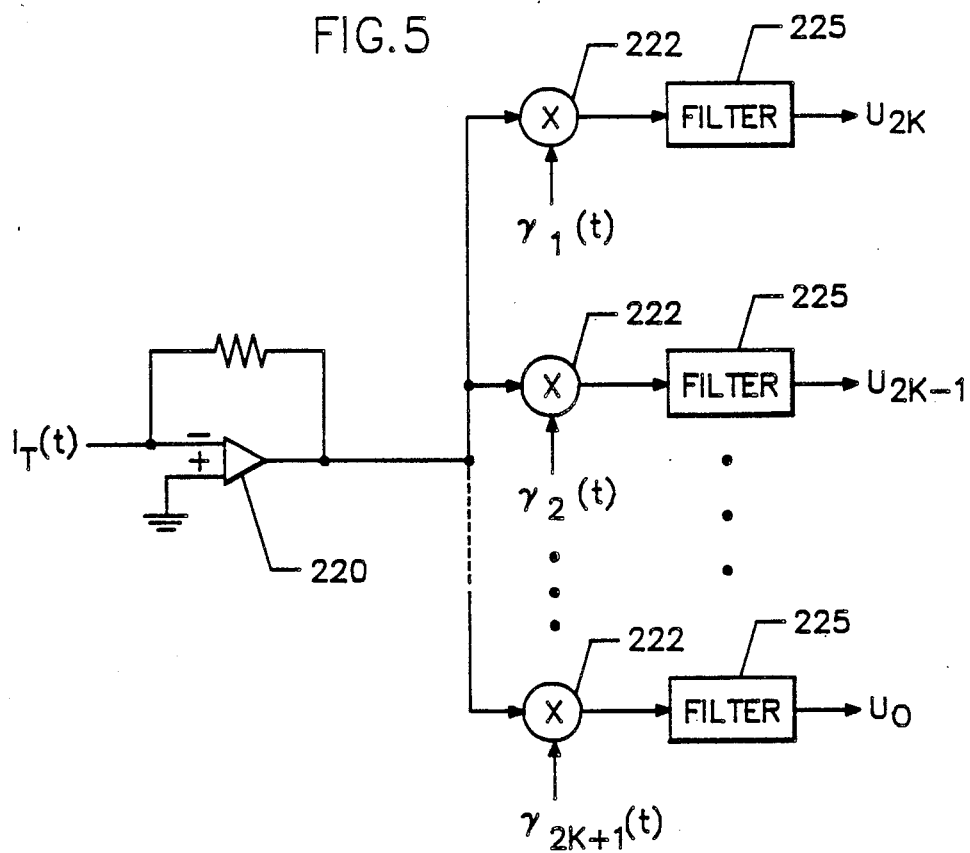
FIG. 5 is a schematic showing part of a signal processing system used in conjunction with the array of FIG. 2.

The currents from each element of each superelement are summed in a "virtual ground" amplifier 220, to form $I_T(t)$, as shown in FIG. 5, where $$I_T(t) = \sum_{i=-N/2}^{N/2} \sum_{j=-N/2}^{N/2} I(i,j,t)$$

The output of this amplifier 220 is divided at location 222 so it feeds 2K correlators 224 and filters 225. Walsh functions are used for $\gamma_n(t)$, so that the multipliers shown in FIG. 5 can be simple mixers.

The correlator outputs are sampled sequentially over all superelements. That is, all the filter outputs $u_k$ are sampled from one superelement, and then all the $u_k$ are sampled from the next superelement and so on until all of the superelements are sampled and then this cycle is repeated.

The output of the correlators is given by:

$$u_x = \int_0^T X(i,t) \cdot \gamma_{x+1}(t) dt = A_x \cdot \phi_x(i)$$

and $$u_{K+x} = \int_0^T Y(j,t) \cdot \gamma_{k+y+2}(t) dt = B_x \cdot \phi_x(j)$$

In the case where only one pixel receives a sudden change in illumination and this is detected on a moving target indicator (MTI) basis, the coordinates of the affected pixel are readily obtained:

$u_0 = A_0 \cdot \Phi_0(i) = A_0 \cdot K_0$ $u_1 = A_1 \cdot \Phi_1(i) = A_1 \cdot K_0 \cdot i$ $u_2 = B_0 \cdot \Phi_0(j) = B_0 \cdot K_0$ $u_3 = B_1 \cdot \Phi_1(j) = B_0 \cdot K_0 \cdot j$ for the case where $\Phi_x(i)$ and $\Phi_y(j)$ are quantized Legendre polynomials. Therefore, the coordinates of the i, j position can be computed by forming;

$i = (A_0/A_1) \cdot (u_0/u_1)$ $j = (B_0/B_1) \cdot (u_3/u_2)$ and where:

$\uparrow u_0 \uparrow \geq \uparrow u_0' + \delta \uparrow$ $\uparrow u_2 \uparrow \geq \uparrow u_2' + \delta \uparrow$ where $u_0'$ and $u_2'$ are the measured values of $u_0$ and $u_2$ at the previous sampling period for the superelement, and where $\delta$ is the MTI threshold.

For this case, the sampling rate for $10^8$ elements at 10 samples per second would be $10^9$ samples per second using the straightforward approach. Using a $16 \times 16$ superelement, the present invention provides for a factor of 64 reduction in the sampling rate:

$$f_s = 10^9 / 16^2 \cdot 4 = 15.625 \text{ Msps}$$

For the occurrence of more than one excited element per superelement, a problem arises in that there is uncertainty in how to pair up the x and y coordinates properly. This problem can easily be resolved if we examine the superelement gain, this time with the biases on some of the potential pairings removed. Thus, if we have a potential pairing that disappears, we know that was the proper pairing. For the specific case of two excited elements in a superelement, a single examination of the superelement with one of the potential pairings suppressed is sufficient to unambiguously detect the correct pairing.

Figure 6:
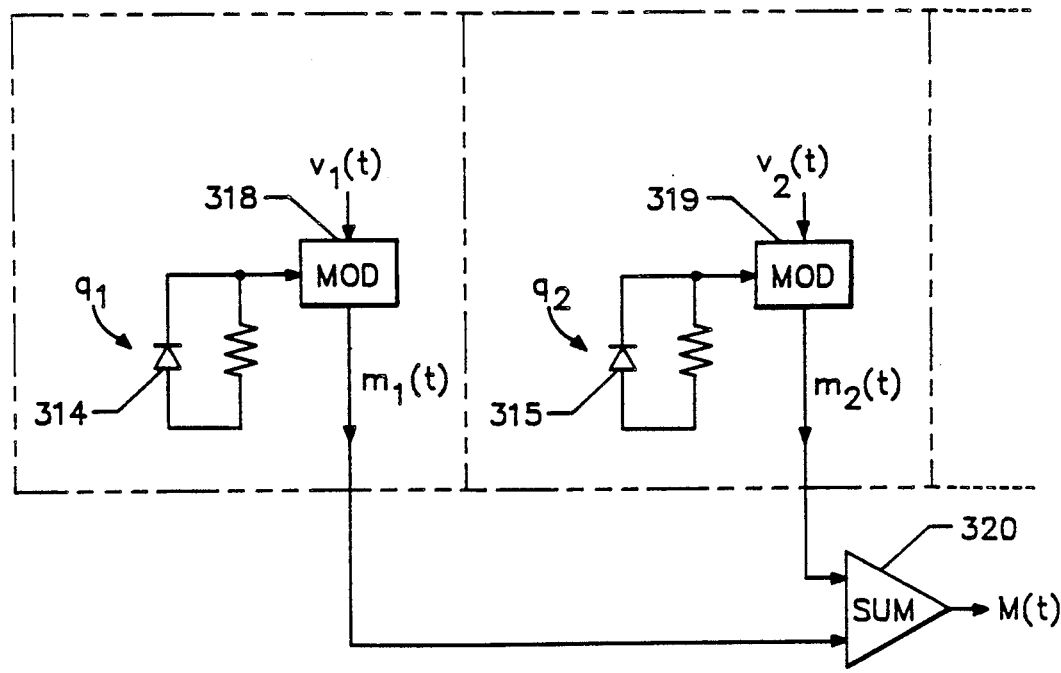
FIG. 6 is a schematic of a modulation scheme for photodiodes in accordance with the present invention.

In the embodiment of FIG. 6, the outputs of two elements 314 and 315 from a one-dimensional array of photodiodes are modulated by modulators 318 and 319 according to respective modulation functions $v_1(t)$ and $v_2(t)$.

The diodes are selected to provide output currents proportional to the incident light intensity so that the modulated output $m_k(t)$ for the $k_{th}$ diode is proportional to $v_k(t) \cdot q_k$. The $m_k(t)$ are summed by amplifier 320 to yield:

$$M(t) \propto v_1(t) \cdot q_1 + v(t) \cdot q_2$$

Thus, M(t) is a sum of terms, each of which is proportional to the incident light intensity and the modulation on a particular element, assuming the incident light intensities are approximately constant over a sampling interval, since if the modulating signals $v_k(t)$ are chosen to be orthonormal signals over this interval, the single signal M(t) can be processed to recover each $q_k$.

In one aspect of the present invention, a number of spatially dependent weighting functions can be used to permit straightforward computations on sums of diode signals to determine the intensities of the light striking the array. This allows centralization of the processing of image arrays. It is described below for a one-dimensional array but is directly extendable to arrays of higher dimensionality.

Figure 7:
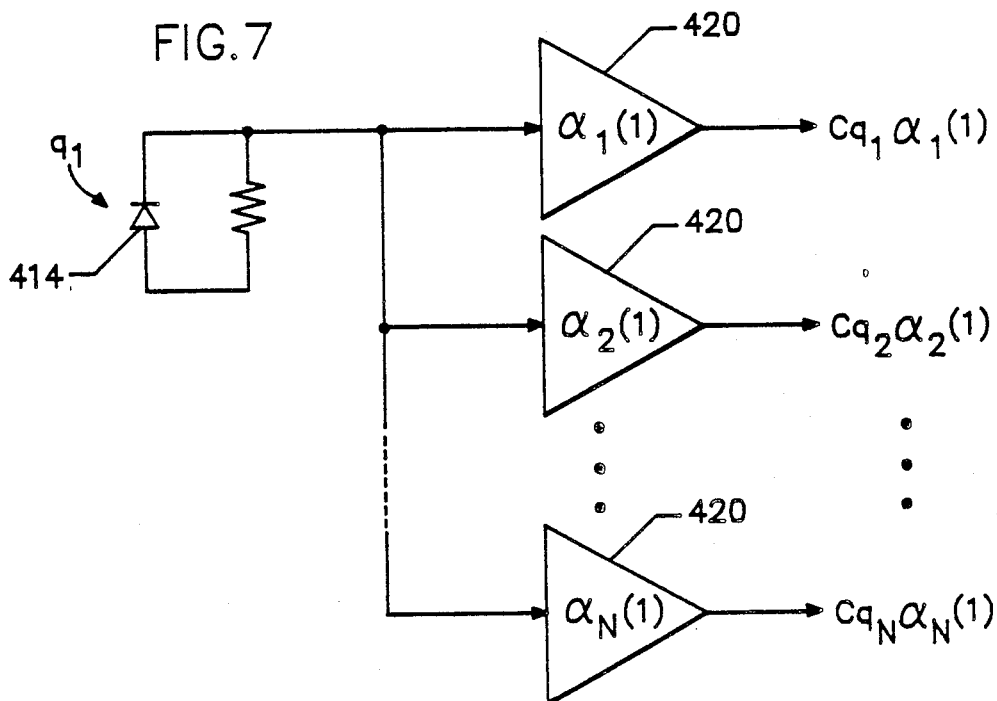
FIG. 7 is a schematic of an N-output photodiode in accordance with the present invention.

The N-output diode element 414 of FIG. 7 consists of a photodiode generating a voltage proportional to the incident light intensity $q_1$, which is then amplified by a factor of $a_j(1)$ for the $j^{th}$ of the N outputs. The amplifications are effected by parallel amplifiers 420.

Figure 8:
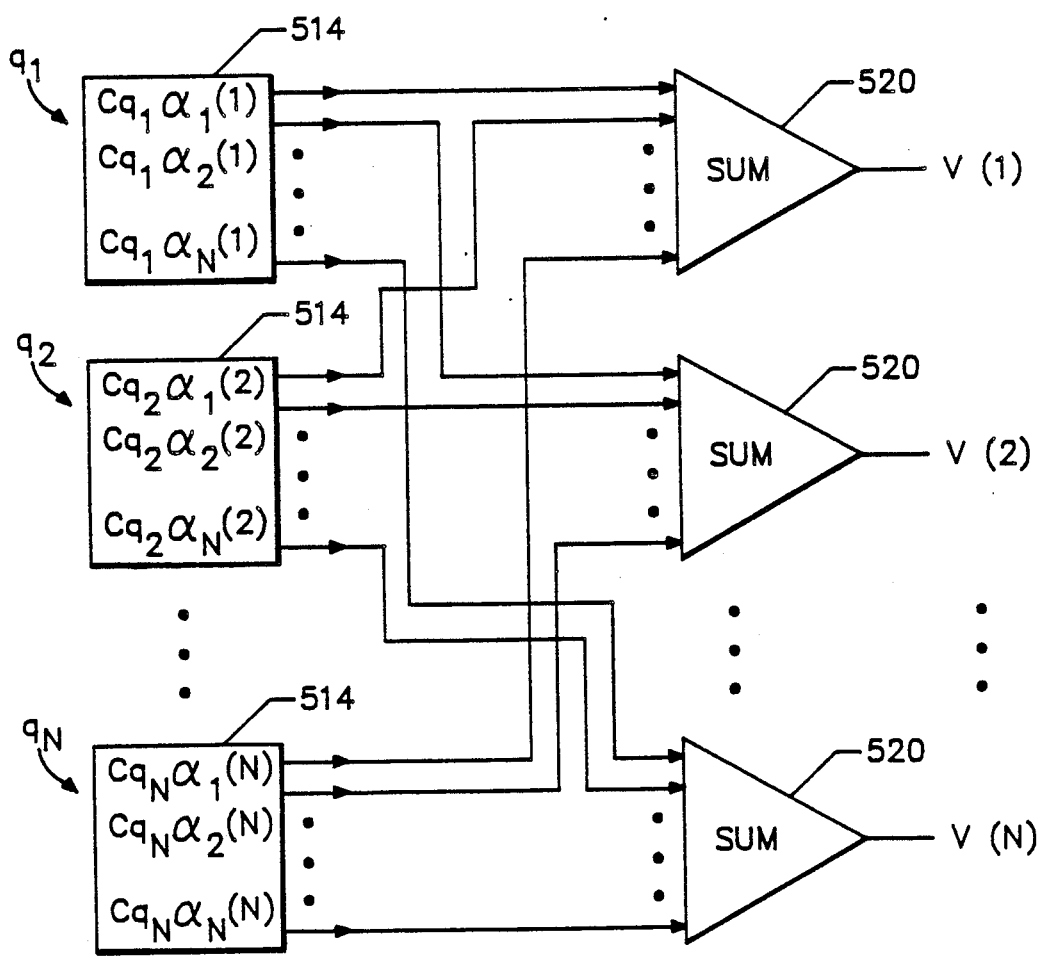
FIG. 8 is a schematic of a signal processing system using spatial weighting functions in accordance with the present invention.

Consider the use of N of these N-output diode elements 514 in an $N \times 1$ array to detect the light intensity incident where the N diodes are located. The configuration and interconnection of these elements are shown in FIG. 8. As is illustrated, the signal form the $j^{th}$ output of one of the N-output diode elements is summed, by a respective one of N summers 520, with the output from the $j^{th}$ element of each of the other (N−1) N-output diode elements. This forms the N sums V(1), ..., V(N), where $$V(j) = \sum_{k=1}^{N} C \cdot q_k \cdot a_j(k)$$

where C is a constant.

This set of equations can conveniently be expressed in matrix forms as:

$$V = Aq$$

where $V = \begin{vmatrix} V(1) \\ . \\ . \\ . \\ V(n) \end{vmatrix}$ and $q = \begin{vmatrix} q^1 \\ . \\ . \\ . \\ q^N \end{vmatrix}$ and $A = [a_{jk}] = C \cdot a_j(k)$.

Thus, we have available V through measurements, A is a matrix of weights which we can choose and q is of interest. Therefore, if A is chosen to be an invertible matrix, q can be calculated in a straightforward manner:

$$q = A^{-1} \cdot V$$

In particular, for the case where N is odd, one can renumber the elements −K, ..., 0, ... K, where K = ½(N−1), and choose the coefficients $a_j(-K), \ldots, a_j(k)$ as samples of the $j^{th}$ order Legendre polynomials over the interval [−K,K]. Then the weight matrix A is orthogonal, and is thus easily invertible.

Modulation tagging of diode signals can be combined with spatial weighting so that multiple output diodes are not required. This technique can be used to advantage in large arrays of photo diodes, where centralized processing is desired, but use of multiple output diode elements is impractical. This approach will be described for a one-dimensional array, but is directly extendable to arrays of higher dimensionality.

As above, a N×1 array of multiple output diode elements can be used to format the signals V(1), ..., V(N), where $$V(j) = \Sigma C \cdot q_k \cdot a_j(k)$$

and where C is a constant, $q_k$ is a measure of light intensity incident on the $k^{th}$ multiple output diode element. As described above, $q_1, \ldots, q_N$ can be determined from the signals V(1), ..., V(N).

Figure 9:
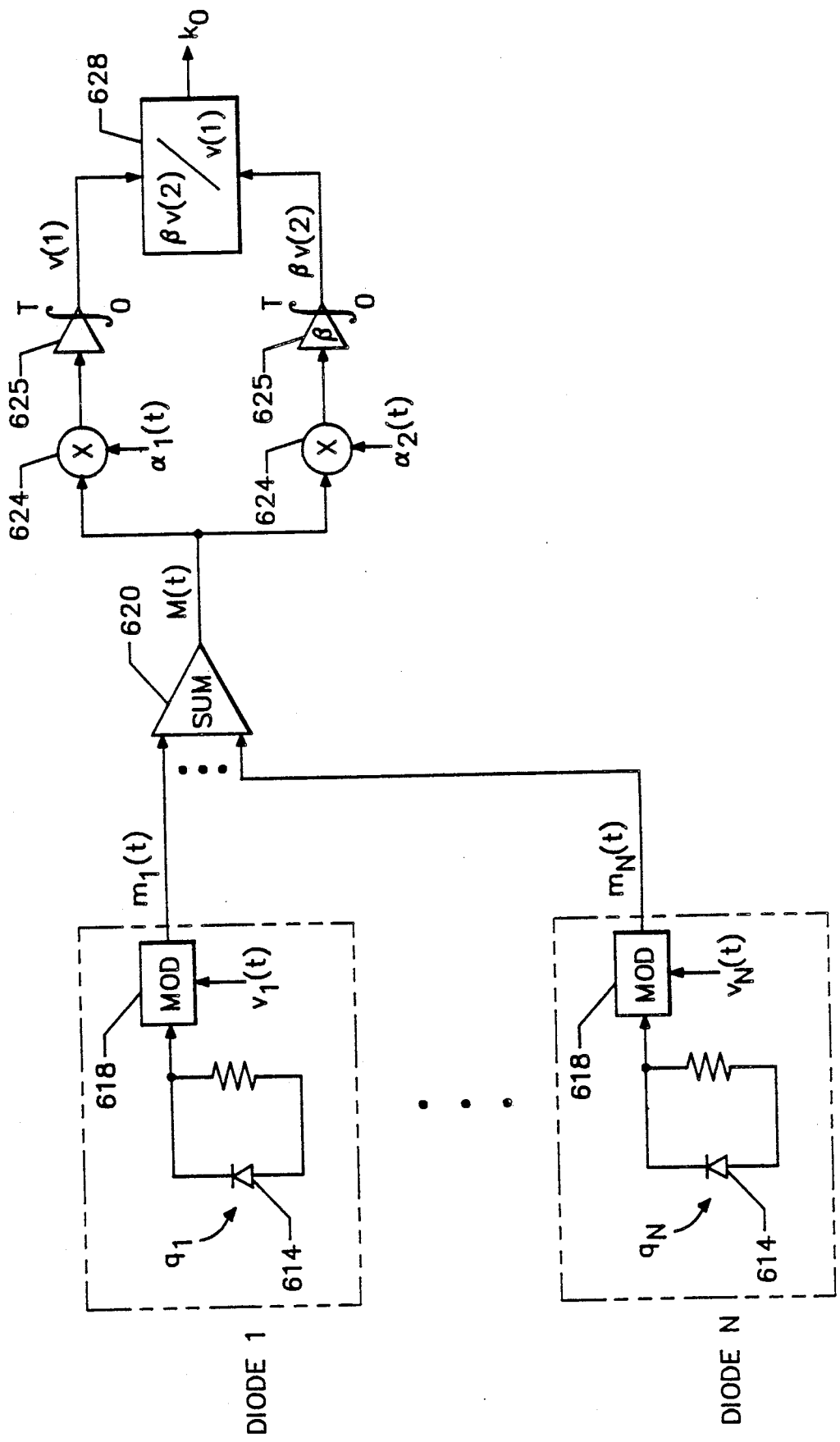
FIG. 9 is a schematic of a single element detection implementation of the present invention.

In the embodiment of FIG. 9, N diodes 614 are arranged in an N×1 array to measure the light intensity incident on the N photo-sensitive diodes 614. The diode outputs are modulated according to respective modulation functions $v_k(t)$ applied by modulators 618.

An amplifier 620 sums modulator outputs $m_k(t)$ to yield a combined output M(t). As described above, the illumination dependent output from the kth diode can be described as:

$$m_k(t) = c \cdot q_k \cdot v_k(t)$$

Thus, M(t) is given by:

$$M(t) = \sum_{k=1}^{N} m_k(t)$$

$$= C \sum_{k=1}^{N} q_k \cdot v_k(t)$$

The modulation functions are selected to have the form:

$$v_k(t) = a_1(k)\gamma_1(t) + a_2(k)\gamma_2(t) + \ldots + a_N(k)\gamma_N(t)$$

where $\gamma_1(t), \ldots, \gamma_N(t)$ form an orthonormal set of time functions over the interval [0,T], such as Walsh functions. Thus:

$$M(t) = C \sum_{k=1}^{N} q_k \left\{ \sum_{l=1}^{N} a_1(k) \cdot \gamma_1(t) \right\}$$

$$= C \sum_{l=1}^{N} \gamma_1(t) \left\{ \sum_{k=1}^{N} q_k \cdot a_1(k) \right\}$$

The mixers 624 and filters 625 yield inner products between M(t) and the time functions $\gamma_j(t)$. The inner product between M(t) and the jth orthogonal time function $\gamma_j$ is:

$$\langle M(t), \gamma_j(t) \rangle = C \cdot \sum_{k=1}^{N} q_k \cdot a_j(k)$$

which is identical to V(j), and the set V(1), ..., V(N) was shown to contain all the intensity information in a recoverable form. Thus, M(t) is a single signal formed as the sum of illumination dependent signals which are appropriately modulated, and can be processed in a straightforward manner to obtain the desired illumination information.

If only one pixel is non-zero, we can determine its location. As above, indices range from −K to K, where K = ½(N−1), and the Legendre polynomial approach leads to the following weight coefficients:

$$a_{jk} = c_j P_j(k/K), j,k = -K, \ldots, K$$

where $c_j$ is a constant. Specifically, the first two rows of matrix A are given by:

$$a_{1k} = c_1$$

$$a_{2k} = c_2 \cdot k$$

where K = −K, ..., 0, ..., K.

If, for example, $q_{k0}$ is the only non-zero reading, then $q_{k0}$ and $k_0$ can be determined from the first two inner products, since:

$$V(1) = c_1 \cdot q_{k0}$$

$$V(2) = c_2' \cdot q_{k0} \cdot k_0$$

Thus, determination of $k_0$ is given by:

$$k_0 = B \cdot \frac{V(2)}{V(1)}$$

where the constant B can be easily eliminated in forming the inner products. This last division can be performed by a processor 628.

To summarize, the image processing system described above provides a technique for enabling the measurement of global properties of an image on a focal plane array (FPA), such as texture, intensity, location, etc. These global properties can be rapidly processed as a "first cut" at processing the recorded image. The measured properties are then used by the digital processor as "pointers" to enable it to process the interesting elements or pixels on the FPA in a faster and more efficient manner. Each superelement or superpixel is defined by several elements or pixels from the FPA and their associated processing circuitry. The signal from each element is multiplied by several scaler functions of its position. Each of these special scaler functions is also modulated with a switch type of carrier, such as Walsh Functions. The output of this modulated signal from the pixel is then summed with the rest of the modulated outputs from other pixels of the superelement. These summed outputs are demodulated with the appropriate Walsh Functions and the integrated outputs are stored on respective capacitors from which each of these integrated outputs can be sampled by a digital processor. Each superelement has exactly the same spatial and time modulating functions for their corresponding pixels.

The concept of the superelement described above allows parallel (analog) processing of all of the elements to be performed simultaneously so that local statistics can be compiled and then sampled by the digital processor. The digital processor uses these statistics for higher order localization of targets. In this phase of operation, the digital processor is given pointers that reduce the sampling rate needed to find a target. In the second phase, the digital processor samples individually selected pixels pointed to by the statistics generated by the superelement. This allows the digital processor to home in on all the areas of interest which may contain targets. For purposes of remaining portions of the description, the portion of the circuit employed in the superelement concept shown in FIG. 1 to process the pixel data in the analog domain, namely the function generator 16, the weighted summer 18, the summer 20, the divider 22, and the correlators 24, will be referred to as modulated detector outputs (MDO's).

Figure 10:
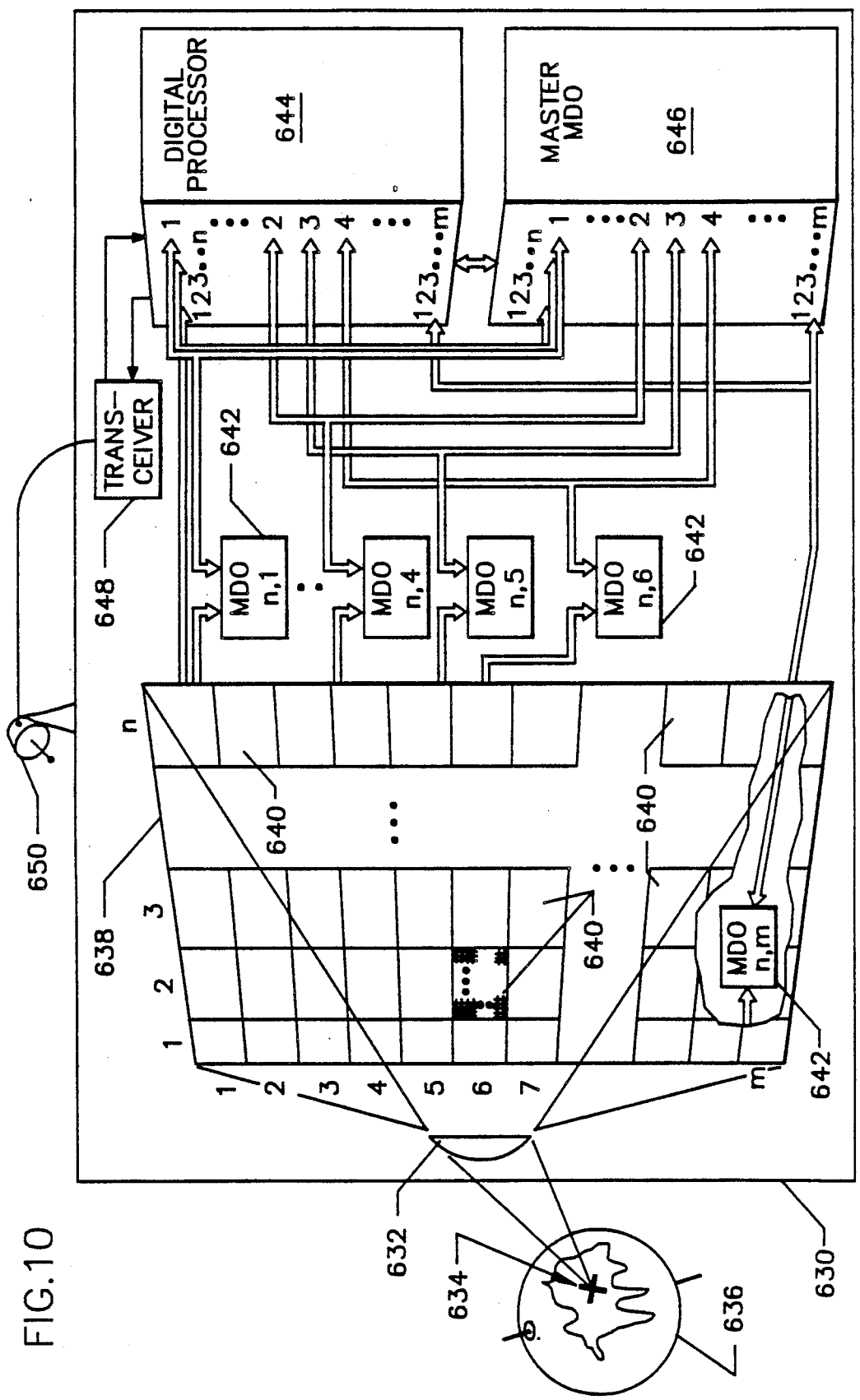
FIG. 10 is a combined block and diagrammatic view of a macro image processing system in accordance with the present invention.

Referring now to FIG. 10, a hierarchical arrangement of several superelements including MDO's are arranged to define what will be referred to herein as a super-superelement. In effect, the superelements are combined to form super-superelements in the same manner that individual elements are combined to form superelements, except that each superelement forming super-superelements has more than one output. As a result, the hierarchical technique of forming super-superelements provides signal outputs that represent the global properties of the image on the FPA. These signals, when sampled by the digital processor, allow it to choose from various stored algorithms for those which are appropriate for use to process the image on the FPA.

To illustrate the super-superelement arrangement, an earth orbiting satellite 630 shown in FIG. 10 includes an image processing system which has a lens or other concentrator 632 for imaging an area 634 of the earth 636 on a large focal plane array 638 which includes photosensitive elements corresponding to picture elements or "pixels." The FPA 638 is arranged in an N×M rectangular array of columns and rows of groups 640 of pixels. Each pixels group 640, is in turn defined by a N×M array of individual pixels elements, with each group 640 effectively corresponding to a single superelement described previously with reference to FIGS. 1-9. Each superpixel or pixel group 640 has operatively associated with it, a corresponding MDO 642. Each of the MDO's 642 provides data to a single digital processor 644 as well as to a master MDO 646. The digital processor 644 outputs processed image data, such as display data to a transceiver 648, and this image data can be transmitted from the satellite 630 by means of an antenna 650. The digital processor 644 likewise may receive control signals from the earth 636 or other source via the transceiver 648. In any event, the array of superpixels 640 and their associated MDO's 642 produce analog data which is processed by the master MDO 646, in much the same manner that the individual MDO's 642 process image data from the corresponding superpixels 640. The function of the digital processor 644 in relation to the master MDO 646 is essentially the same as that described previously with reference to FIG. 1.

As mentioned above, the correct scaler spatial functions used to modulate the X and Y axis of the superelement or the super-superelement is a set of orthogonal functions. With the image modulated and summed by a set of orthogonal functions, the signals stored in the superelement or super-superelement demodulators represent the coefficients of the image on the corresponding superelement or super-superelement expanded into a set of orthogonal functions. There are, of course, many sets of orthogonal functions into which the image can be expanded and the choice of orthogonal functions is application specific and is chosen such that only a few coefficients need to be calculated in order to permit use of the expansion to predict the value at any given point. Also, the set of orthogonal functions should be chosen such that the equations for the coefficient itself represents an application-specific useful equation. In connection with the present disclosure, it may be appreciated that an expansion in terms of Legendre polynomials is useful. If there are only a few pixels that are energized, then the equation for the coefficients are used to solve the locations of these pixels. However, if a large number of pixels are energized, then these coefficient equations are used to calculate the value or represent the value of the distribution of signals across the superelement surface to be used in whatever algorithm that is found useful, such as determining the texture of the image.

Figure 11:
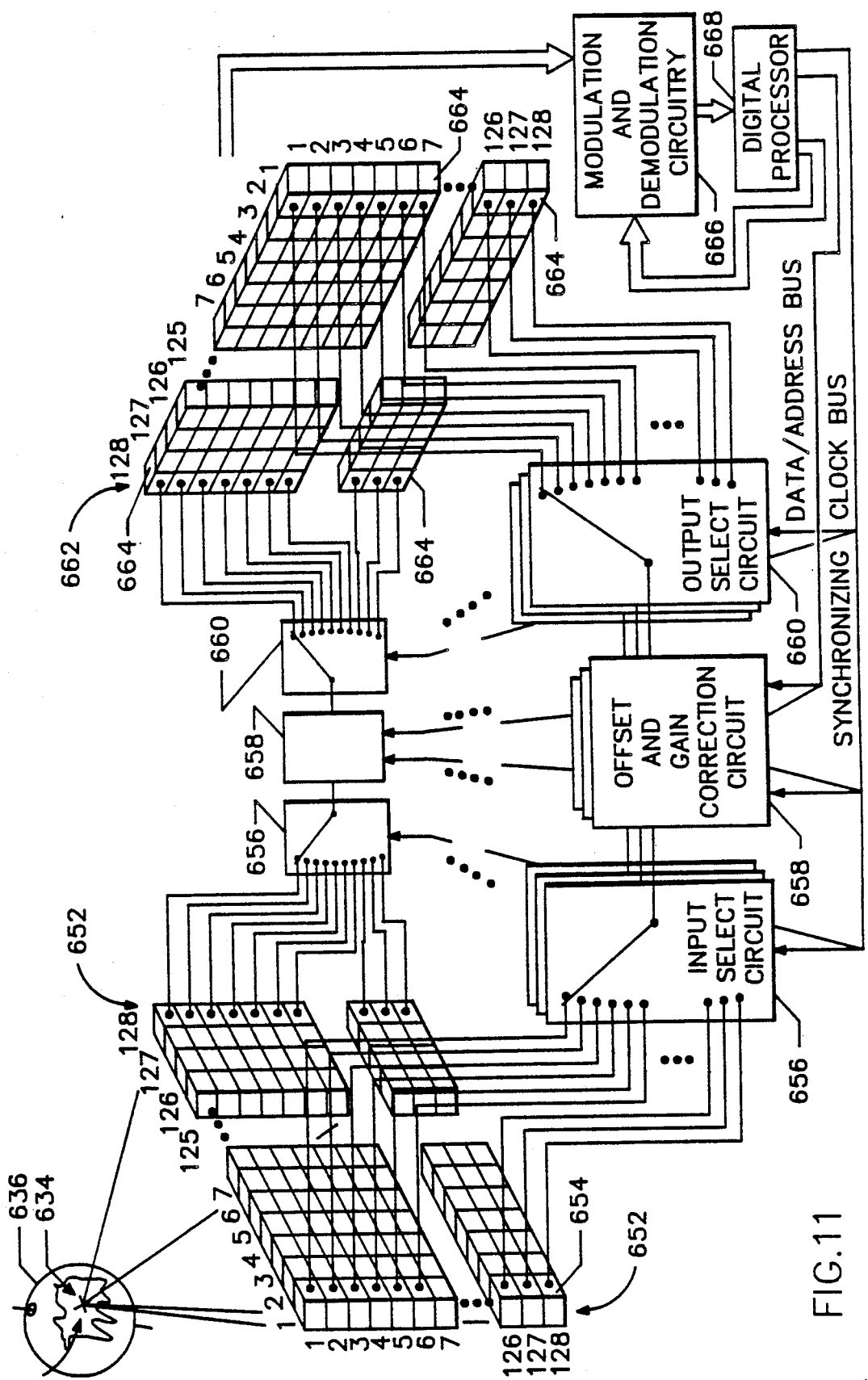
FIG. 11 is a combined block and diagrammatic view depicting the generation of a pseudo-focal plane array in accordance with the present invention.

Attention is now directed to FIG. 11 which depicts an arrangement for essentially "freezing" the image formed on a focal plane array 652 so that the individual pixel signals can be modulated by several signals in a parallel fashion to develop the necessary components of signal pointers that allow the digital processor 668 to process the image data. As previously mentioned, the focal plane array 652 comprises a rectangular array of image detectors corresponding to picture elements or "pixels" 654 onto which an image is imposed. In this particular example, the FPA 652 is stationed on a spacecraft so as to record an image of a particular area 634 on the earth 636. In the present example, the FPA is depicted as a 128×128 pixel array. The FPA 652 reads out rows of 128 pixels per clock signal and these pixel signals are delivered to 128 select signal circuits 656 which are respectively associated with the columns of pixels in the FPA 652. The select circuits 656 are conventional devices, each of which has a plurality of inputs respectively connected with the pixels of the associated column and a single output which is switched to one of the inputs; thus, each select circuit 656 is a "one of 128 selector." As a row of pixels 654 is read out, the signals are transmitted by the select circuit to an associated offset and gain correction circuit 658, whose details will be discussed later. The offset and gain correction circuits 658 function to correct the gain of the incoming signal and then apply an offset correction voltage, if necessary, so that all of the pixel signals will be corrected relative to each other in spite of inherent differences in their responses because of physical variations in the photo elements in the array which produce the signals. Each row of corrected signals is then passed through an associated output select circuit 660 to a corresponding pixel location in a storage medium defining a pseudo focal plane array (PFPA) 662. The output select circuits 660 are conventional devices similar to the input select circuit and function to switch the signal on their respective inputs to one of a plurality of outputs which are respectively connected to a column of storage elements 664 in the PFPA 662. The input select circuits 656, offset and gain correction circuits 658 and output select circuits 660 receive data, addresses and synchronizing clock signals from the digital processor 668. Each row of pixel data is transferred from the FPA 652 through the corresponding offset and gain correction circuits 658 to the PFPA 662 within a single clock signal. The input select circuits 656 and output select circuits 660 are synchronized in operation by the digital processor 668 so as to sequentially read the rows of pixel data from the FPA to the PFPA 662. With the corrected image data loaded into the PFPA, later described modulation and demodulation circuitry 666 operates on the data stored in the PFPA in a parallel fashion to develop the components of the previously discussed signal pointers.

From the foregoing, it can be appreciated that the PFPA 662 operates to separate the functions associated with generating the desired voltages or currents in an optimum manner for each pixel on the FPA 652 from those functions associated with utilizing these signals in a quick and efficient manner by the digital signal processor 668. In effect, the PFPA 662 functions as a "sample and hold" of each pixel of the PFA 652.

Figure 12:
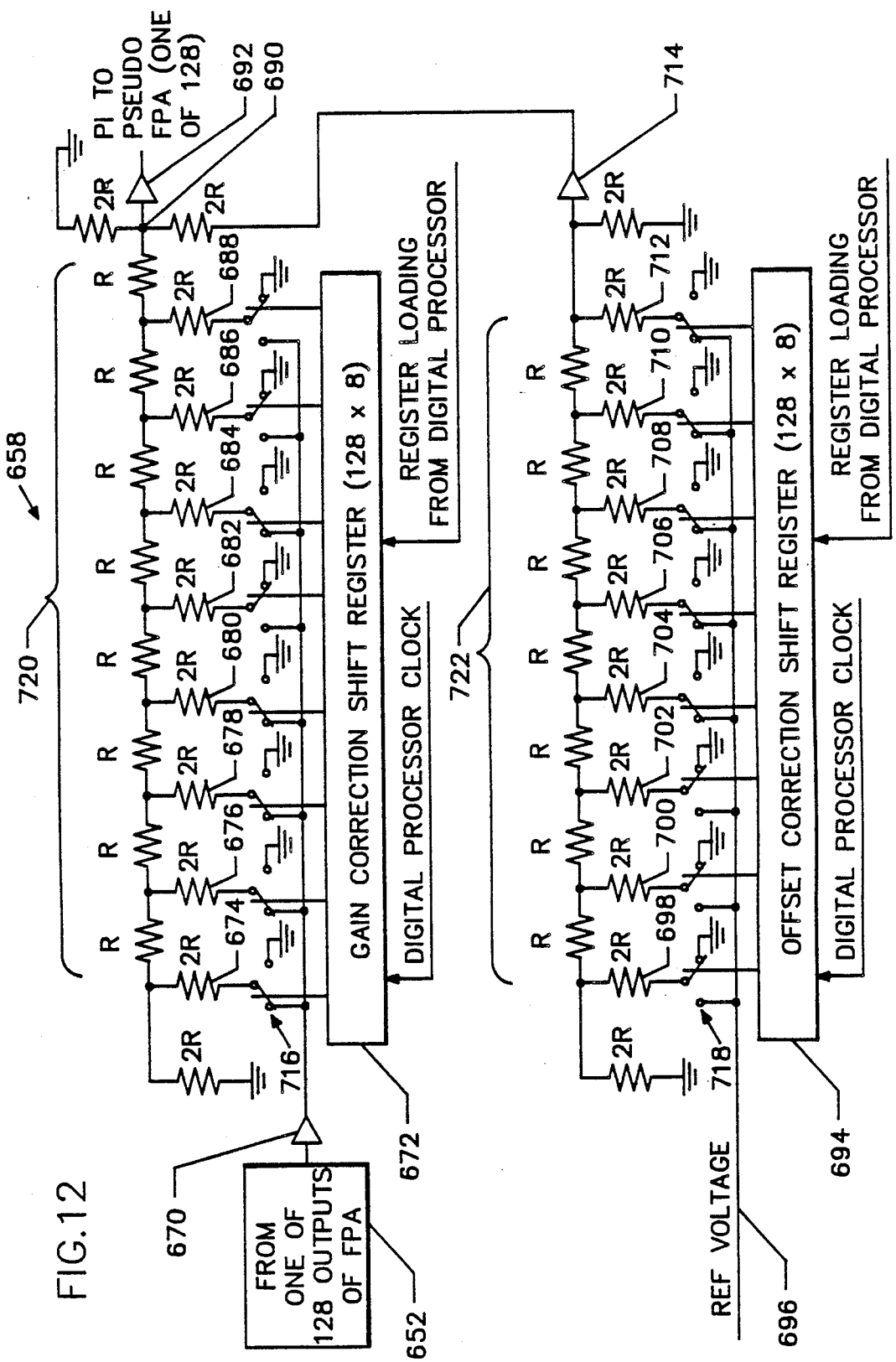
FIG. 12 is a combined block and schematic diagram of an offset and gain correction circuit in accordance with the present invention.

The details of one of the offset and gain correction circuits 658 is depicted in FIG. 12. An output of the FPA 652 is delivered to the input of the offset and gain correction 658 and is initially amplified by an amplifier 670. The amplified signals are then delivered to a bank of switches 716 which are coupled in parallel with each other and are controlled in accordance with information stored in a gain correction shift register 672. Each of the switches 716 couples the input signals through a respectively associated resistor 674-688 and a plurality of additional resistors 720 which are coupled in series relationship with each other. The register 672 stores a multibit gain correction factor received from the digital processor 668 (FIG. 11). The correction factor stored in the gain correction shift register 672 determines which of the switches 716 are switched from ground to a position which routes the incoming image signal, thus, preconfiguring the resistor network formed by resistors 674-688 and 720, and thereby correcting the voltage of the input signal. The input signal whose gain has thus been corrected is delivered to a summing point 690.

A multibit offset correction is delivered from the digital processor 668 (FIG. 11) to an offset correction shift register 694. The summing point 690 is coupled with a reference voltage source 696 via a resistor network comprising resistors 698–712 and 722, and a bank of switches 718. The switches 718 are individually controlled in accordance with the correction factor stored in the register 694 and thus route the reference voltage 696 through the appropriate resistors in order to obtain the desired offset voltage determined by the digital processor 668. The offset voltage is amplified at 714 and combined with the gain corrected signal at the summing point 690. This combined signal is then amplified at 692 and delivered to the proper storage location in the PFPA (FIG. 11).

The digital processor 668 (FIG. 11) effectively calibrates the offset and gain correction circuit depicted in FIG. 12 and downloads the appropriate correction factors to the registers 672, 694. Corrections are calculated by the digital processor 668 by applying unity correction factors and uniformly illuminating the FPA 652 (FIG. 11) at threshold values; reading all pixels; doubling the uniform illumination; and again reading all pixels. Calculated correction factors are then loaded into the shift registers 672, 694. Once downloaded, the correction factors are circulated through the shift registers 672, 694 at the FPA readout rate.

An alternate embodiment of an image processing system will now be described with reference initially to FIG. 13. Disposed within a container such as the dewar capsule 800 is a focal plane array (FPA) 12, offset and gain correction circuitry 808, and modulated detector output circuit (MDO) 802. The MDO 802 is comprised of the pseudo-FPA (PFPA) 810 and the modulation and demodulation circuit 812. The output of the modulation and demodulation circuitry 812 is fed via bus 814 to a digital processor 804 which includes A-to-D convertor 804.

FPA 12 is typically a large imaging array as described above which is sensitive to a radiative event. The radiative event can be one which is found anywhere within the electromagnetic spectrum, but the infrared portion thereof is particularly applicable to the disclosed invention. The image which is exposed onto the focal plane array 12 is read therefrom by the offset and gain correction circuit 808. The offset and gain correction circuit, as previously described with reference to FIGS. 11 and 12, corrects the signals from every pixel 14 found on the FPA before sending such signals to the PFPA 810. Offset and gain correction circuit 808 corrects the individual signals from the FPA 806 by linearizing each individual pixel signal and then standardizing each linearized signal. The overall effect achieved by the offset and gain correction circuit 808 is to eliminate any differences in sensitivity which may exist between detectors (or pixels) 14 found within the FPA 12.

Offset and gain correction circuit 808 places the linearized signals onto the PFPA 810 by way of bus 809. PFPA 810 includes an array of sample and hold circuits or any other means which is capable of storing analog information. Modulation and demodulation circuit 812 reads the signals which are stored onto the PFPA 810 and modulates them in a way which allows useful statistics to be generated from the signals produced by detector array 12. These useful statistics are delivered to digital processor 804 by way of bus 814. Digital processor 804 then uses these useful statistics that have been generated in the modulation and demodulation circuitry to directly interrogate the PFPA 810. These may also be used for any additional image processing tasks which require information of a global nature. Direct interrogation of PFPA 810 by digital processor 804 takes place along bus 811.

In creating useful statistics within the modulation and demodulation circuit 812, the number of samples that would otherwise be taken from the FPA by digital processor 804 is massively reduced. It is important to note that once digital processor 804 uses bus 816 to initialize circuits 808, 810 and 812, no additional commands are sent along bus 816 during the normal operation of the device. This approach allows digital processor 804 to concentrate its processing energy on acquiring useful statistics from circuit 812 and statistics which have been generated from other FPA's (not shown here) and if necessary to interrogate by way of bus 811 individual pixels in the PFPA 810. Because offset and gain correction circuit 808 and modulation and demodulation circuit 812 can function on their own once they are initialized, digital processor 804 need not be concerned with the real-time control of circuits 808 and 812.

In order to more clearly explain the purposes and advantages of creating useful statistics by way of MDO 802 circuit, a brief analog can be drawn. When a researcher wishes to investigate a subject which he knows can be found in a thirty-volume set of encyclopedias, he does not approach the task by sequentially reading every word in the first volume, and then proceed to read every word in the second volume all the way through each volume until he finds the subject matter of interest. The approach the researcher uses to find the subject matter of interest is to use the encyclopedias' table of contents, index, etc. These mechanisms for limiting the researcher's work are all designed to direct the researcher toward the interesting pages of the encyclopedia in as quick a manner as possible.

If a similar mechanism could be applied to the image which is captured on a PFPA 810, the processor 804 would not have to read and process every PFPA pixel 813 in order to find the interesting ones (i.e. the valid radiative targets). The use of the MDO circuit 802 provides such a mechanism to quickly find for instance the centroid of intensities in a group of illuminated PFPA pixels 813. The technique used by the MDO circuitry to generate these useful statistics including centroid of intensity will now be explained.

Figure 14:
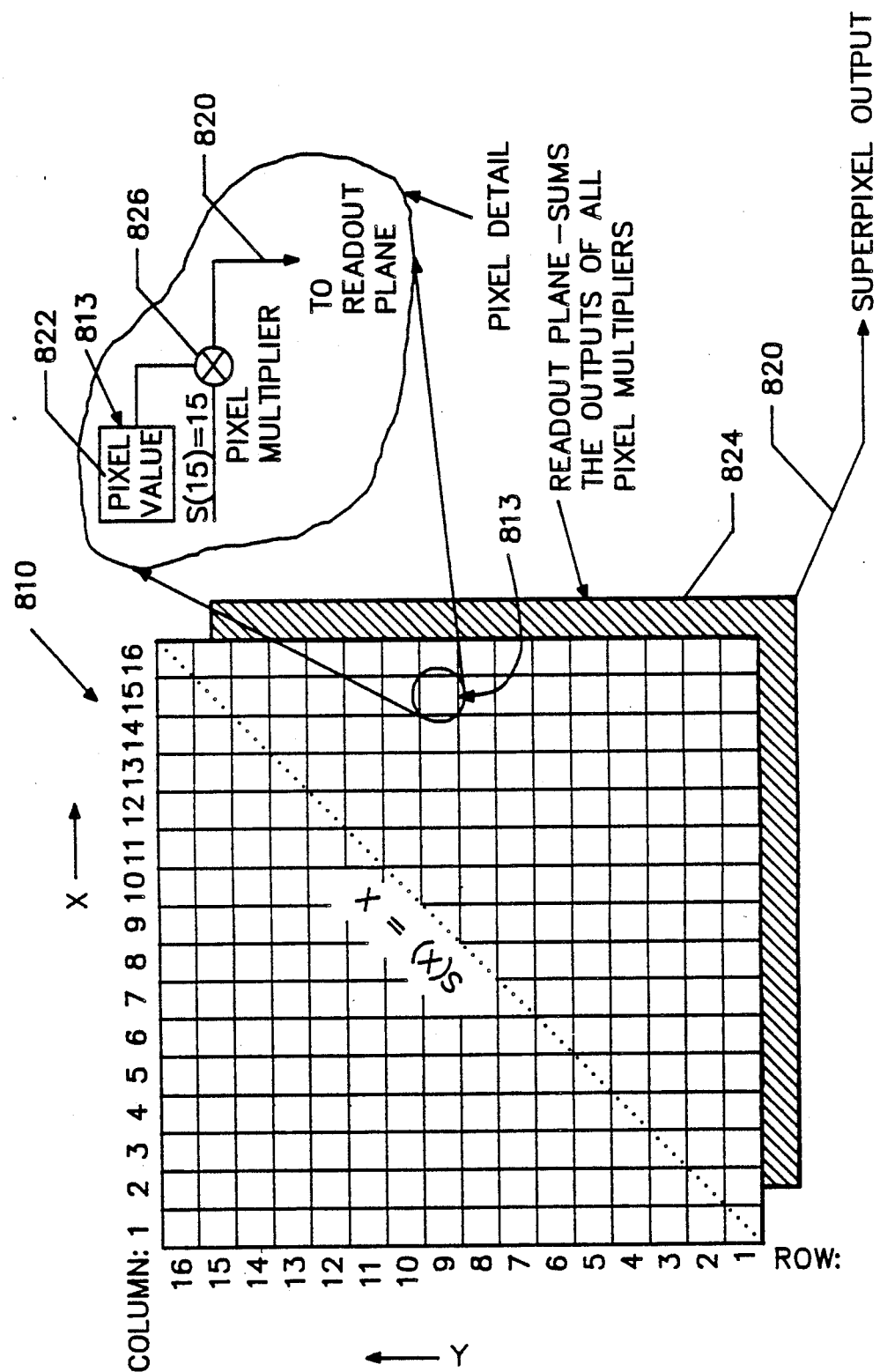
FIG. 14 is a combined block and diagrammatic view of a pixel array depicting how the S functions are applied to individual pixel signals.

FIG. 14 shows a 16x16 array 810 which is made up of 256 PFPA pixels 813. The pixels or detectors 813 could be those found on the FPA 12 (FIG. 1). For the purposes of discussing the MDO circuitry and technique, it is inconsequential where the individual pixels are located. Each pixel 813 is capable of storing a pixel value 822. This pixel value 822 is representative of the magnitude of the radiative event which is projected onto that particular pixel. After each pixel value is multiplied by an S function, $S(x)$, it is dumped to the read-out plane 824 where it is summed with all of the pixel values which have been operated on by their own respective $S(x)$ function.

As an illustration, suppose that a programmable multiplier 826 is associated with each pixel 813, and that the outputs of all 256 multipliers 826 are summed into a single output 824 for the entire superpixel 810. The function $S(x)$ is the number by which each pixel is to be multiplied according to its relative position within the superpixel 810. It can be easily seen that if function $S(x)$ is a constant, for example 1, the superpixel's output 824 will be the algebraic total of all of the individual pixel intensities.

The graph of FIG. 14 shows that the function $S(x)$ is a linear function with respect to x and y. Each pixel's intensity is multiplied or weighted by the address of the column that it is located in. When weighing each pixel's intensity by its respective column and summing all columns, the superpixel's output is proportional to the sum total of each individual pixel intensity multiplied by their common x coordinate. Dividing by the total intensity will produce the column number of the centroid. Half of the intensity falling on the superpixel will be found to the left of the centroid column and half will be found to the right of the centroid column.

Replacing the x dependence of the S function and making it dependent on the y variable, $S(x)$ can be replaced with the new function $S(y)$, thereby making the S function a linear function of y. Each pixel intensity is now weighted by the address in the row in which it is located. Taking the entire sum total of each row of pixels which have been operated on by the $S(y)$ function and dividing this total by the total pixel intensity will produce the row number of the centroid. Half of the incident energy falling on the superpixel 810 will be above that row, and half will be found below it.

It is therefore possible to locate the centroid of intensities in the superpixel 810. By simply performing three reads and three divides, a processor can be informed of the centroid and average intensity of signals incident upon the superpixel 810. If the processor is furnished with the centroid information, it can use that information to guide a search which is centered upon the centroid of nearby pixels to find those pixels which differ from the average by some threshold amount. For accessing individual detectors 813 during this search, line 811 in FIG. 13 is provided. If the detectors 14 on the focal plane array 12 are to be accessed, a bus 817 is provided for this purpose. The processor can be programmed in many ways to use the centroid information, including saving the intensity and centroid information from frame to frame and examining successive samples for significant temporal variation.

The S functions discussed above have been concerned only with the first two moments of superpixel intensity: average and centroid. This is not to suggest, however, that higher order moments could not be used in detecting interesting events and guiding the processor's search. The approach herein disclosed therefore allows for the application of arbitrary S functions to the pixel multipliers 826. Consequently, it is not necessary for S to be a linear function of x or y. Moreover, the disclosed method can be used to compute non-separable functions of x and y, and to perform temporal as well as spatial processing.

What has just been shown is how the average intensity and the centroid of radiation incident upon a superpixel can be determined by sequentially applying three functions to the pixel multipliers: a uniform function to read out total pixel intensity; a linear $S(x)$ function to calculate x centroid; and a linear $S(y)$ function to calculate y centroid. The method disclosed herein, however, does not apply these functions sequentially, but rather, they are applied simultaneously. This simultaneous application is achieved by modulating each function onto three orthogonal carrier signals which are then summed into a single superpixel output. The summed output is then demodulated to recover the useful statistics or the values generated by the S functions. This parallel method minimizes the time which would otherwise be necessary for generating useful statistics using sequential techniques and also reduces the number of signal wires necessary to conduct the computations.

Although any orthogonal function can be implemented for applying the three S functions, Walsh functions are preferred because they can be constructed from sets of binary orthogonal functions so as to minimize switching noise generated in the MDO 802 circuitry. The multiplying function provided by pixel multipliers 826 is accomplished by pulse-width modulating the Walsh functions. If the proposed use of digital signals to modulate and multiply analog signals is implemented, switching noise and modulation noise can be kept at a level which approaches the theoretical minimum of 0.

In order to illustrate the power achievable using the MDO system, especially as it pertains to threat warning systems, the following hypothetical will be used assuming the following values for important system parameters:

(1) The FPA 12 is a 128×128 array which is read out column-by-column by the offset and gain correction circuit 808 and placed column-by-column into the PFPA 810.

(2) The frame rate is 1 KHz. The frame rate is the number of times per second that the entire contents of the FPA 12 must be read and placed into the PFPA 810.

(3) The FPA is further subdivided into superpixels which are 16×16 square arrays. This parameter depends heavily on the mission scenario used. It is linked to the expected values of target intensity, clutter intensity, and background intensity. The distribution of targets and clutter in space and the amount, kind, and rate of digital processing also affect the sizing of the superpixels. The disclosed method saves significant processing throughput for superpixel sizes ranging from 4×4 to 16×16. If the superpixels are 16×16, then the PFPA is an 8×8 array of 64 superpixels.

(4) The image captured by FPA 12 can be copied to PFPA 810 in 32 $\mu$sec. In order to read the entire FPA within 32 $\mu$sec., the individual columns must be addressed for read-out at intervals of approximately 250 nsec. (250 nsec.×128 columns=32 $\mu$sec.).

(5) Individual pixels in the PFPA can be sampled at intervals of 250 nsec.

(6) Non-uniformity correction is performed within offset and gain correction circuit 808 using standard techniques.

(7) A single digital processor is used to read the intensities and centroids of all superpixels, to recognize temporal changes in superpixels, to search about the centroids for interesting pixels, and to determine the S function to be applied to pixel multipliers.

(8) The processor output consists of the location and intensity of all pixels which differ from the background average intensity by a predetermined amount.

(9) The processor performs an operation in 100 nsec. For illustrative purposes, an operation is defined for example as: input a word; output a word; rear or write a memory; perform and add; multiply; or divide. Setting a timeframe of 100 nsec. to perform an operation of this type is not beyond the technology available today. Processors are presently available which can perform ten such operations in 100 nsec.

(10) Twelve bits of intensity resolution.

(11) S functions are set at system initialization time to read out total intensity and x and y centroid of intensity.

(12) The non-uniformity correction factor is loaded into the offset and gain correction circuitry 808 at system initialization.

The above-mentioned assumptions produce the following system sequencing:

(1) The FPA 12 takes about 1 msec. to capture an image. During the last 32 $\mu$sec. of the 1 msec. period, the FPA image is copied to the PFPA 810. Non-uniformity correction is performed during the copy operation by circuit 808. The corrected pixel values remain available in the pseudo-FPA 810 until the next frame is read in at the end of the next 1 msec. time period.

(2) 32 $\mu$sec. after the copy is complete, each MDO 802 presents to the processor 804 the three values produced by the S functions.

(3) The processor reads the superpixel outputs. There are three outputs per superpixel, and 64 superpixels, so there are 192 words to be read. Assuming each read operation requires five steps, and also assuming that another five steps will be used by the processor in performing a temporal comparison during this read, it will take the processor 192 words or 192 $\mu$sec. to read the three outputs of every superpixel and process those three outputs.

(4) Assume that eight of the 64 superpixels show changes in intensity or centroid that trigger a search, or are otherwise identified for further examination. Also assume that on average the processor must read 128 pixels from each of those superpixels in order to locate all of the threshold exceedences for a total of 1,024 read operations. Assuming that the processor can make a decision by accumulating exceedences, and that on the average it can decide to stop after reading 64 pixels, a total of 10 operations per pixel or 1,024 $\mu$sec. will be needed to interrogate the target information.

(5) Using the above analysis, the processor has performed about 12,000 operations to process a frame of data, taking approximately 12,000 $\mu$sec. In order to account for overhead, communication time, and estimation errors, we will double this time and estimate it at approximately 25,000 digital processing operations to process the entire 16,384 pixel frame.

If the MDO technique is used to process the FPA pixel information, the digital processor 804 must perform 25,000 operations per frame or about two operations per pixel. That number compares very favorably with techniques that do not use the MDO approach. The result of using the MDO approach is that it allows for the computation of useful statistics in real-time without the supervision or intervention of digital processor 804. MDO is used to quickly perform statistical computations, which are then transferred to the processor in order that it may direct its attention towards pixels of interest. The MDO technique can produce statistics in just 4 $\mu$sec.

Figure 13:
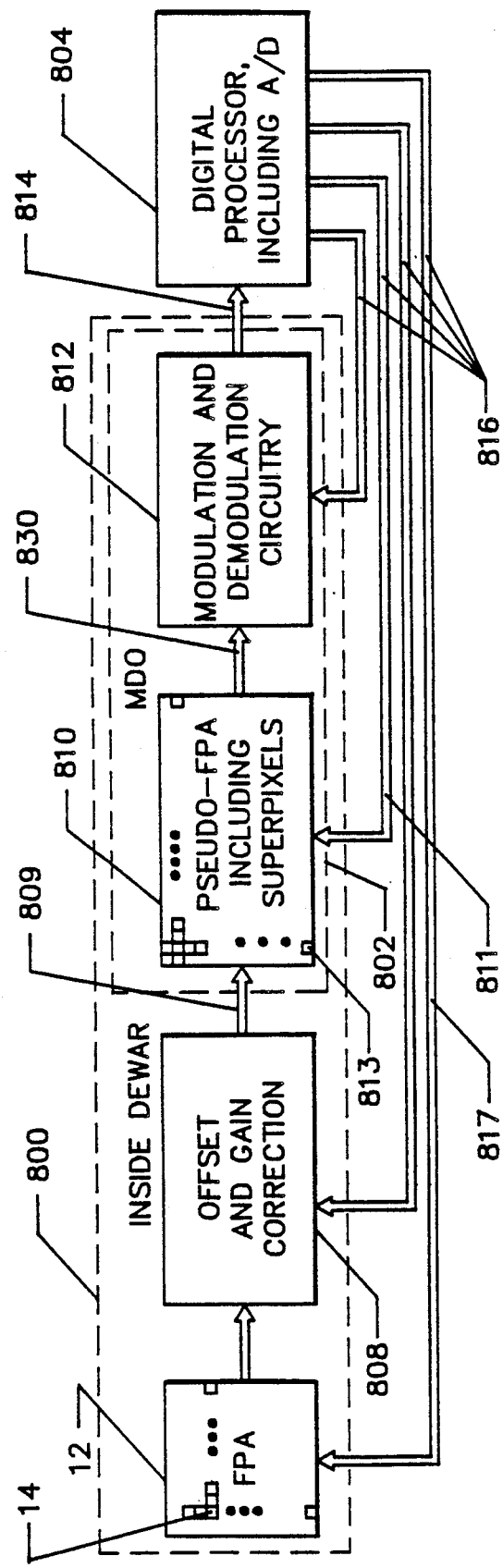
FIG. 13 is a block diagram of an alternate embodiment of an image processing system according to the present invention.

Now referring to FIGS. 13 and 14, PFPA 810 is comprised of an array of detectors or pixels 813. It is often convenient to subdivide the PFPA's into clusters of pixels. This cluster or subgrouping of pixels within a PFPA defines the superpixel previously described. Thus, a superpixel is an array of pixels from which a set of local statistics may be generated. The superpixel can take on any of various dimensions such as in the range of 4×4 pixels (making a total of 16 pixels per superpixel) to generally an upper limit of 16×16 pixels (a total of 256 pixels). Once the superpixel has been sized to the appropriate application, the MDO technique is employed to generate local statistics on the superpixel. These local statistics are typically: (1) the average value of all of the signals on the superpixel; (2) the x moment of this average measured from the center of the superpixel; (3) the y moment of this average measured from the center of the superpixel. Although the x moment, y moment and average value will be used throughout this disclosure to demonstrate the MDO system, it will be demonstrated that other local statistics can be generated based on the specific application under consideration.

The following illustrates one mathematical approach that can be used to determine the x moment, y moment and average value of an image stored on a superpixel. Let $V_p(x,y)$ be the signal level at the (x,y) pixel in the superpixel. The average signal output, $V_a$, is given by:

$$X: = -x_1 \ldots x_1 \quad Y: = -y_1 \ldots y_1 \quad V_a: = \sum_X \sum_Y V_p(x,y)$$

and the moment, $V_x$, in the x direction is given by $$V_x: = \sum_X \sum_Y x \cdot V_p(x,y)$$

and the moment, $V_y$, in the y direction is given by $$V_y: = \sum_X \sum_Y y \cdot V_p(x,y)$$

where $2 \times x_1 = 2 \times y_1$ and $2 = x_1$ is the size of the superpixel in the x direction.

In determining the size of the superpixel used in a particular application, the clutter background and the signal level of the desired image must be considered. It can be seen that if only a few targets are expected to fall on the FPA at any given instant of time, and if the clutter background is low, then a $16 \times 16$ superpixel should be used. This is because on average only one unresolved hot-spot against a dark background is expected in any one superpixel. In this situation, the hot-spot can then be precisely located at coordinates $x_1, y_1$ with only three samples and two divisions:

$$V_a: = V_p[x_1, y_1]$$
$$V_X: = x_1 V_p[x_1, y_1]$$
$$V_Y: = y_1 V_p[x_1, y_1]$$
So:
$$x_1: = \frac{V_x}{V_a}$$
$$y_1: = \frac{V_y}{V_a}$$

The first three calculations ($V_a$, $V_x$, $V_Y$) are performed within the modulation and demodulation circuit 812. The two divisions needed to derive $x_1$ and $y_1$ may be performed by a look-up table within the digital processor 804. By way of this example, it is shown that by using MDO techniques, the number of samples acquired by the digital processor 804 is three. If conventional digital techniques are used to read each pixel and compute the necessary values within the digital processor, the digital processor would be forced to read each one of the 256 pixels found on the PFPA. In this example, the number of samples is therefore reduced from 256 to 3, and the amount of digital processing required is vastly decreased.

If, on the other hand, there is a cluster of signals on the FPA, then $x_1$ and $y_1$ represent the centroid of the cluster as measured from the center of the superpixel. This coordinate can be made the starting location of a spiral search or any other search technique which can be conducted by the digital processor, in order to discover the extent and nature of the cluster size.

Figure 15B:
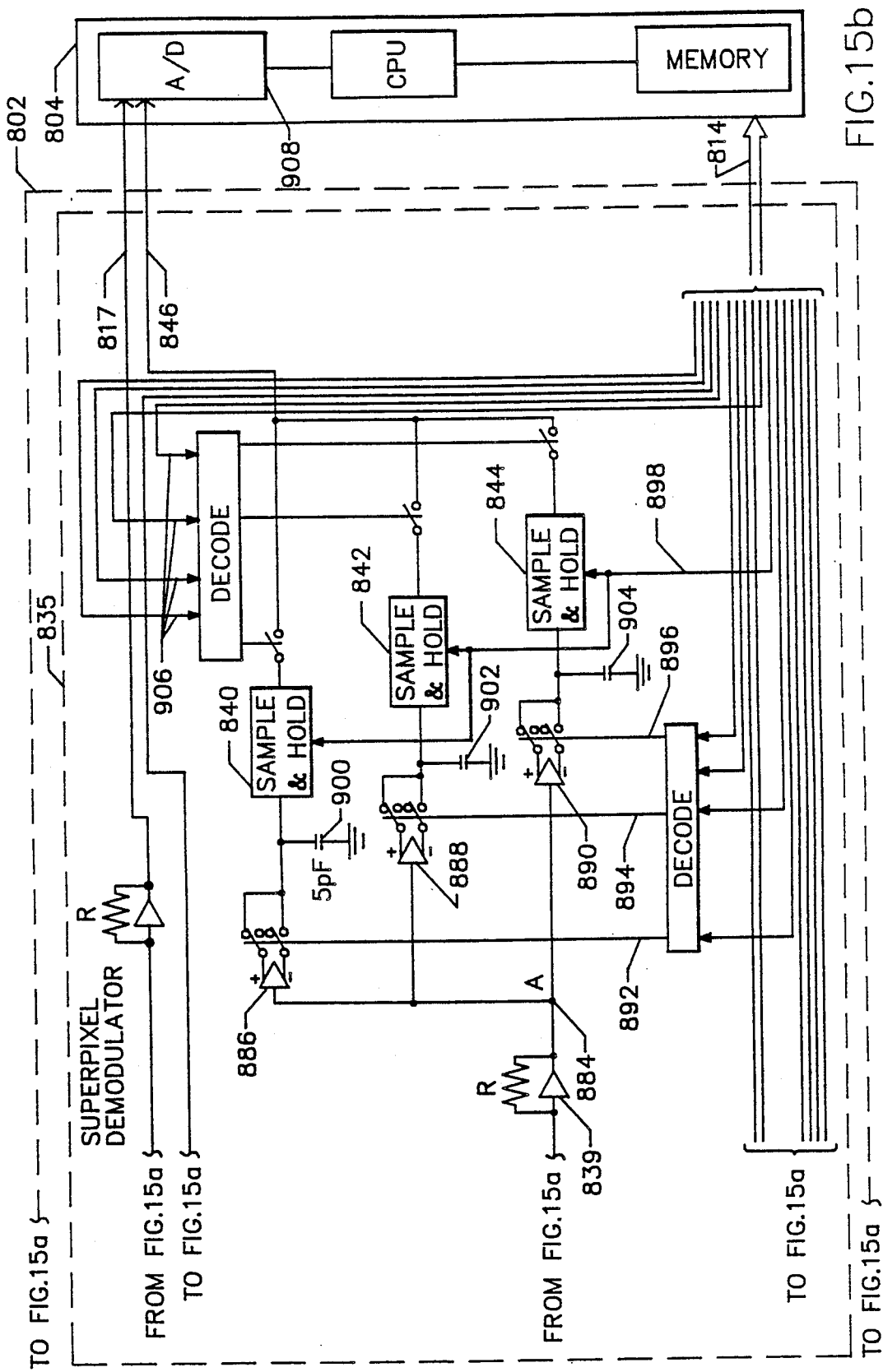

Now referring to FIGS. 13, 15a and 15b, pixel values originate on individual detectors 14 found on FPA 12. These originating pixel values pass from FPA 12 to PFPA 810 by way of the offset and gain correction circuit 808. Assuming that PFPA 810 is comprised of 256 pixels 813, the entire PFPA contains 64 superpixels where each superpixel is comprised of an 8×8 array of pixels 813.

FIGS. 15a and 15b will now be discussed which depict a detailed block diagram of the MDO circuit 802. Individual bus elements 809 carry the offset and gain corrected signals from the offset and gain correction circuit 808 to the respective pseudo-FPA pixel locations 813. The superpixel is defined in this illustration as a 16×16 array of PFPA pixels and therefore there is depicted in FIG. 15a as PFPA pixel 1 shown at 813 through PFPA pixel 256 shown at 832. Each of the PFPA pixels 1 through 256 interfaces with its respective modulator circuit 837-836. The output of each of the 16 modulators 837-836 is summed at the node indicated at 838 and is then amplified by the amplifier 839 shown in FIG. 15b. The output amplifier 839 is then distributed to three separate demodulator circuits wherein each circuit demodulates and is responsible for constructing one of the local statistics. Each local statistic is then stored in its respective sample and hold circuit 840-844 where then it is made available to digital processor 804 by way of bus 846.

Bus lines 848 and 850 shown in FIG. 15a control process 804 access to individual pixels. There is a unique bus line 848 for every pixel row and a unique bus line 850 for every pixel column. When a bus pair 850, 848 is read out onto the pixel output plane (PO) 817 shown in FIG. 15b, all other pixels in the superpixel will have at least one switch open. This scheme of being able to directly read the value stored on an individual PFPA pixel allows the digital processor 804 to bypass the demodulator 837, demodulator 835 circuit and therefore directly interrogate the PFPA pixel.

FIG. 15a shows the output of each sample and hold 834 is routed to its respective modulator 837 along path 852. Amplifier 854 receives the signal transmitted along path 852 and produces an inverted version of that signal on conductor 856 and a non-inverted version of that signal on conductor 858. Depending on the position of control line 860, one and only one version of the signal will be transmitted to point 862. The signal at point 862 is presented to three different switches 864-868. Each switch is connected in series to a respective resistor 870-874. The resistors 870-874 are brought together and joined at node 838. The respective resistors from modulator 2 through modulator 256 are also brought together and joined at node 838. The design of the present system only contemplates one switch per modulator 864-868 being closed at any one given instant of time. Distinct from the nature of the PFPA pixel output found at point 852, the signal found at point 838 is the sum total of all totals from all 256 PFPA pixels, each modulated by their respective switches.

The modulating switches 864-868 are controlled by four binary digital control lines 876-882. There is an $X_1$, $X_2$ pair 882,880 for each column in the superpixel array, and $Y_1$, $Y_2$ pair 876, 878 for each row. Although these four lines 876-882 can be used to encode 16 possible modulation functions (i.e. $2^4$), the present example only uses three modulation functions.

Under control of the modulation lines 876-882, the PFPA pixel value found at point 852 is first multiplied by 1 or −1 depending on the setting of control line 860 and then passed through one of three resistors 870-874 depending on the setting of switches 864-868. The signal is then delivered to the superpixel data plane 838 where it is summed with the other modulator 255 outputs within that superpixel. Because of the configuration of amplifier 854 and constraints placed on the control logic, there are only seven possible gains available through the modulator circuit: −3, −2, −1, −0, 1, 2, 3. All 256 pixels of the superpixel are summed at point 838, each having been already multiplied by its own gain factor applied by its respective modulator.

Figure 16A:
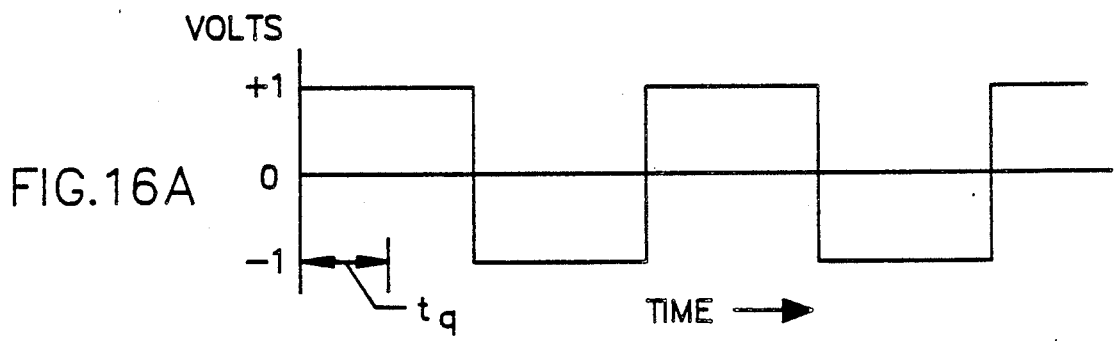
FIGS. 16A through 16C are three orthogonal waveforms which are used to modulate the pixel signals.
Figure 16B:
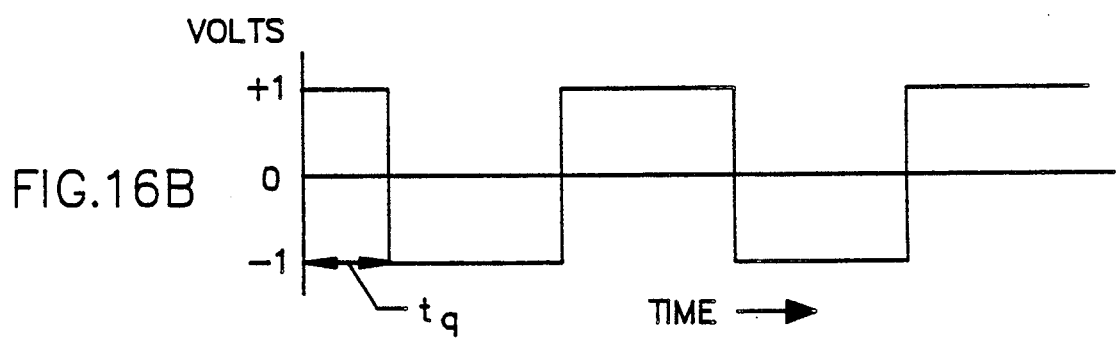
Figure 16C:
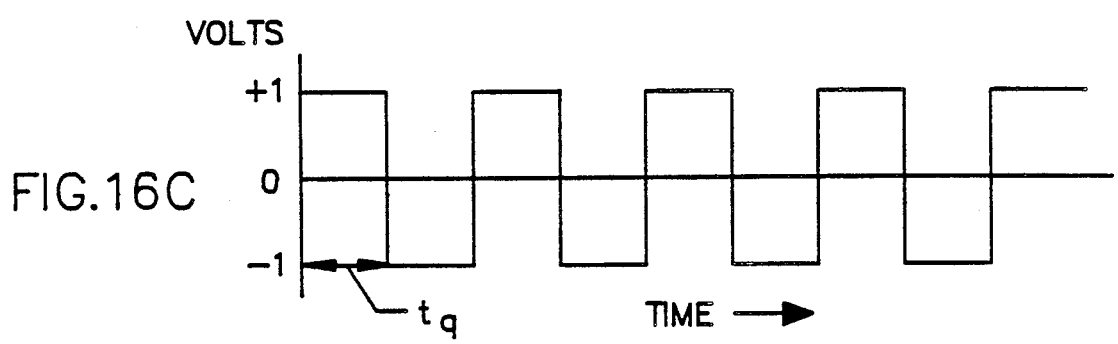

Except for the zero state, the seven gain states previously mentioned are exactly the same number of gain states that would be achieved if a pixel were modulated by three bi-level, mutually orthogonal signals. The zero state is derived from the implied pulse-width modulation that will be discussed later. FIGS. 16A-16C will now be used to show the waveforms of three such orthogonal signals.

FIG. 16A shows a quadrature squarewave having a period of $4t_q$. FIG. 16B shows a squarewave having the same period as that shown in FIG. 16A, but leading in phase by a time duration of $t_q$. FIG. 16C shows a squarewave which is twice the frequency of the wave shown in 16B. The waves 16A-16C could also be Walsh functions, if desired. Squarewaves have been shown in order to simplify the explanation.

Now referring to FIGS. 15b and 16, the sum of all of the signals indicated at 884 is distributed among three buffer amplifiers 886-890 in the superpixel's demodulator 835. Each buffer 886-890 multiplies the signal presented to it at its input by 1 or −1 and feeds its respective integrating correlator capacitor 900-904. If the signal indicated at point 884 is comprised of the three orthogonal waveforms described in FIGS. 16A-16C, then the amplitude of each waveform can be recovered on each correlator capacitor. This waveform recovery occurs if the demodulator control lines 892, 894, and 896 are controlled by those orthogonal waveforms.

The waveform which is recovered on each correlator capacitor is then fed to its respective sample and hold circuit 840, 842 and 844. These sample and holds will then maintain the integrity of the signal until processor 804 has an opportunity to sample each respective sample and hold signal along bus line 846. When processor 804 has completed reading the outputs of each respective sample and hold circuit 840, 842, and 844, it can then clear the contents of each respective sample and hold along control line 898, thereby enabling the sample and hold to stand ready to receive the next input cycle.

FIGS. 15a and 15b have been used to disclose a method to recover three copies of the total pixel intensity on the correlator capacitors, each recovered from an orthogonal modulation created by varying the gain factor of each pixel.

What will now be explained is how arithmetic functions can be performed across the surface of a superpixel by controlling the pulse-widths of the orthogonal modulation signals. Again referring to FIGS. 16A-16C, it is possible to modulate the pulse-width in every time interval $t_q$ shown in FIGS. 16A-16C. Only the first $t_q$ period is referenced in each figure, but the following discussion pertains to each $t_q$ duration within each wave period. In any one of the aforementioned figures, it can be seen that any one of the three waveforms is orthogonal to the other two waveforms over a period defined by $4 \times t_q$. Two waveforms are said to be orthogonal to each other if when multiplied together and integrated over a $4 \times t_q$ period, the resultant integration is 0. Orthogonal functions share additional unique features such as if any of the waveforms is multiplied by itself and integrated over a $4 \times t_q$ interval, then the resultant integration equals unity. Another unique feature of orthogonal functions is that if any waveform is multiplied by its own inverse and subsequently integrated for a $4 \times t_q$ interval, the result is −1.

If any one of the three waveforms is switched to 0 for a fraction "alpha" of each $t_q$ time interval and then multiplied by any of the other two waveforms, the resultant would still be 0. This illustrates the fact that by switching a portion of the $t_q$ time period of any orthogonal wave to 0, the orthogonal relation is still preserved. But if this pulse-width modulated signal is multiplied by the original signal which has not been pulse-width modulated and integrated over a $4 \times t_q$ interval, then the resultant integral would be 1−alpha. Or, if the pulse-width modulated signal were multiplied by the inverse of the original waveform, the result would be alpha−1. This demonstrates the essence of the disclosed method for introducing a function S that can be set to a range of values between 1 and −1.

Figure 17A:
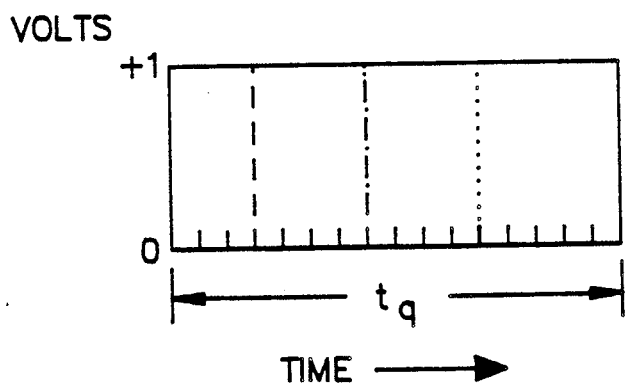
FIGS. 17A through 17E are waveforms depicting how the orthogonal functions are modulated.
Figure 17B:
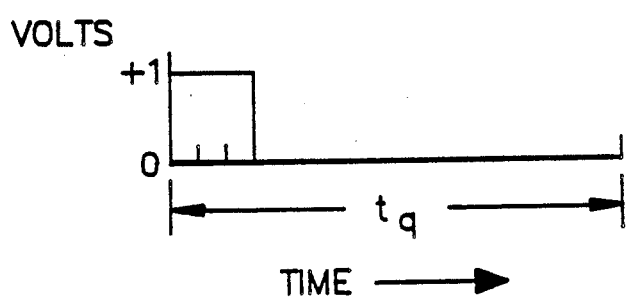
Figure 17C:
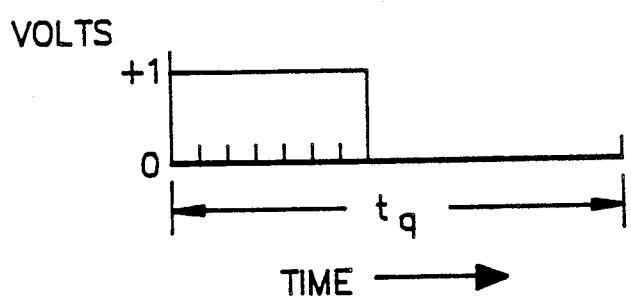
Figure 17D:
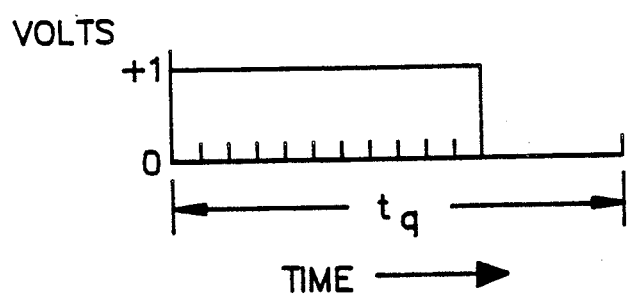
Figure 17E:
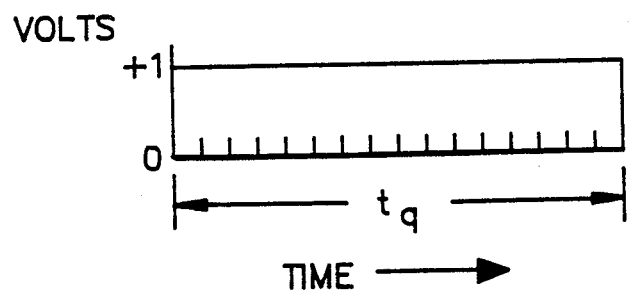

Reference is now made to FIGS. 17A-17E, each of which depicts an expanded $t_q$ interval. FIG. 17A shows a $t_q$ period which has been divided into sixteen portions, each portion may have an amplitude of 1, 0, or −1 within the $t_q$ interval. Values between 0 and −1 are achieved by simply shifting the waveform by 180°. The waveform of FIG. 17B would yield a value of 3/16ths if the waveform is integrated over the $t_q$ duration. The waveform shown in FIG. 17C integrates out to a value of 7/16ths, and the waveform of FIG. 17E integrates out to unity. By modulating each of the three orthogonal functions over each $t_q$ duration of their respective periods, the modulated orthogonal functions can be used to simultaneously apply three different S functions across the superpixel's surface. This is achieved by changing the control lines 876, 878, 880 and 882 shown in FIG. 15a at a frequency of $16/t_q$. The S functions are imposed on the surface of the superpixel by manipulating the four control lines differently for each row and column. Thus, all of the pixels in the first row would receive an orthogonal function which has been modulated by turning $t_q$ quadrant on for 1/16th of each of its four $t_q$ periods. Likewise, the pixels in the third row would be operated on by an orthogonal function which had all four of its $t_q$ quadrants operated on by the modulation wave shown in FIG. 17B. The pulse-width determines the value by which each pixel is multiplied by before being summed into point 838 shown at FIG. 15a.

Figure 18:
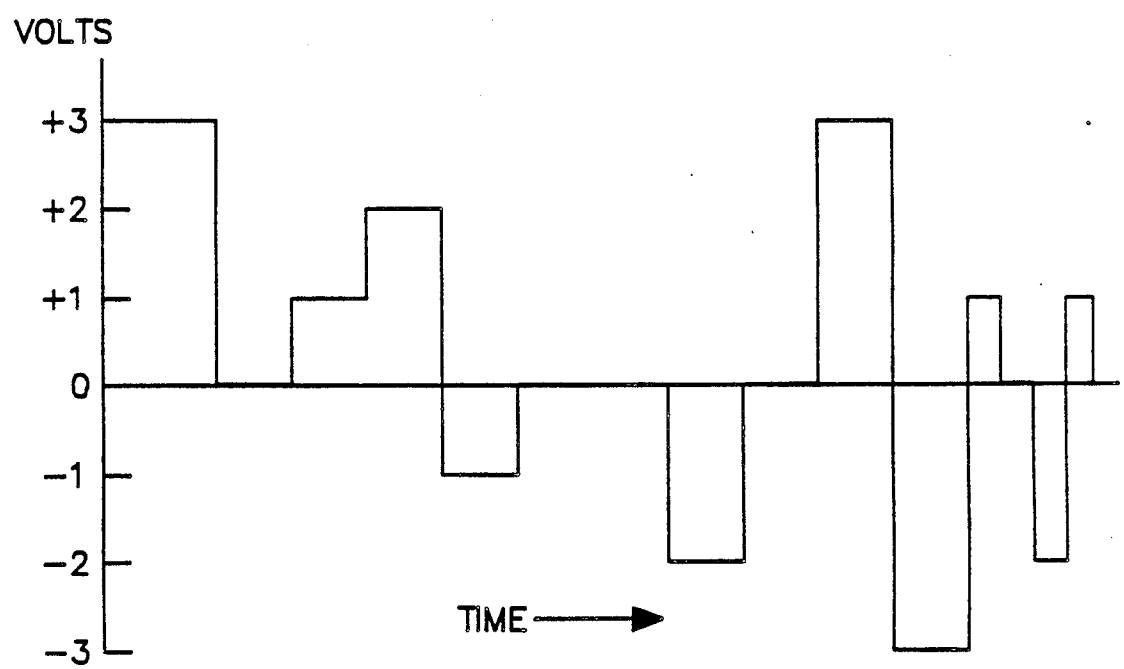
FIG. 18 is a waveform depicting the modulated orthogonal signals.

FIG. 18 is a hypothetical example of what three orthogonal functions would look like upon being summed together and applied to one pixel if each of the orthogonal functions had been first modulated by having a portion of each of its four $t_q$ periods switched to 0 for a portion thereof.

Referring again to FIG. 15b, the three S functions which are applied to each pixel are recovered on the demodulator's correlator capacitors 900, 902 and 904 by controlling the demodulator's control lines 892, 894 and 896 with the three original orthogonal waveforms (i.e. ones which have not been modulated).

After the respective correlation capacitors integrate for a $4 \times t_q$ interval, the integrated signals residing on each respective sample and hold 840, 842 and 844 can be gated along bus 846 into the digital processor 804. Because the orthogonal waves are inherently synchronous with each other, the correlation which takes place on the correlation capacitors is synchronous and, accordingly, the theoretically possible zero correlation noise of zero may be achieved. By using the control lines 814 to select a superpixel and a function, the digital processor 804 can gate one of the S functions onto the superpixel output plane 838 and through the A/D 908 from which it may read the value of that function. A new set of three S functions is available for reading every $4 \times t_q$ interval.

If modulation lines 876–882 are changed at a 16 MHz rate, then $t_q$ is 1 psec. long and $4 \times t_q$ is 4 psec. long. At this rate, a new set of three S functions is available for reading by the digital processor every 4 psec. and, 750 different S functions can be calculated in a 1 msec. frame. This translates into a phenomenal processing rate, which is accomplished in real-time by analog circuitry which may be reconfigured under computer control. In this way, the MDO can be used to solve many imaging processing problems which are not approachable using classical digital techniques.

Once the useful statistics which are generated by the S functions are acquired by the digital processor 804, the digital processor uses these statistics to confine its attention to only the "interesting" portions of the image incident on the PFPA. Only these areas then need be subjected to conventional spatial and temporal processing. This is believed to be a novel approach to the design of systems concerned primarily with unresolved point targets. Three particular S functions have been used in disclosing the method herein, but certainly other S functions could be used. The particular mission scenario, available processing power, and strategies for exploiting MDO capabilities will all be factors which play into selecting the ultimate S functions to be used in any given application.

In our example, we have limited $t_q$ to sixteen divisions, which translates into four bits of resolution for our S functions. Holding the 16 MHz clock rate constant, a finer quantization can be achieved by increasing the integration time beyond $4 \times t_q$. Accordingly, one bit of resolution is added every time the integration is doubled.

Additionally, by having only disclosed herein three simple S functions (i.e. average intensity, x centroid and y centroid), no implication is intended that these are the only or most important S functions to be used. Other S functions may be suggested by realizing that the three S functions presented herein represent the first two coefficients of an expansion of the surface radiation intensity in terms of Legendre polynomials of the first kind.

The first four Legendre polynomials of the first kind are:

$$P_0 := 1 \quad P_1 := x \text{ or } P_1 := y$$
$$P_2 := [1/2][3x^2 - 1] \text{ or } P_2 := [1/2][3y^2 - 1]$$
$$P_3 := [1/2][5x^3 - 3x] \text{ or } P_3 := [1/2][5y^3 - 3y]$$

The first three Legendre polynomials of the second kind are:

$$Q_0 := [1/2]\ln\frac{[1+x]}{1-x} \text{ or } Q_0 := [1/2]\ln\frac{[1+y]}{1-y}$$

-continued $$Q_1 := [x/2]\ln\frac{[1+x]}{1-x} - 1 \text{ or } Q_1 := [y/2]\ln\frac{[1+y]}{1-y} - 1$$

$$Q_2 := [1/4][3x^2 - 1]\ln\frac{[1+x]}{1-x} - [3/2]x \text{ or }$$

$$Q_2 := [1/4][3y^2 - 1]\ln\frac{[1+y]}{1-y} - [3/2]y$$

The above-mentioned formulas provide for useful additional S functions.

Because x and y are defined over the region of 1 and $-1$, it might be suggested that polynomials of the second kind are not to be explored because of the singularities at the edges of the region. However, this suggestion should be of no concern because these singularities are integrable. Because the disclosed method uses a quantized MDO approach, the singularities will integrate to a finite value for the edge pixels.

Thus, several embodiments of the present invention and variations thereof have been disclosed. From the foregoing, it is clear that the present invention is applicable to detection systems for a wide variety of spatial distribution variables, and is not limited to photo-detection. Different modulation and processing schemes can be used. Accordingly, the present invention is limited only by the scope of the following claims.

I claim:

1. For use with an image processing system of the type including an array of image sensors each producing a signal representing image data and a processor for processing the image data produced by the array of image sensors, a system for correcting the values of said image data signals produced by said image sensors relative to a reference value, comprising:
   a plurality of selection means each operative for selecting signals produced by a respectively associated portion of said array of image sensors; and
   a plurality of signal correction means respectively coupled with said selection means and each operative for correcting the signal values produced by said image sensors corresponding to said respectively associated portion of said array of image sensors.

2. The system of claim 1, wherein said plurality of selection means and said plurality of correction means are coupled with said array of image sensors and said processor.

3. The system of claim 1, wherein each of said selection means is controlled by said processor to sequentially select said image data signals.

4. The system of claim 3, wherein said selection means includes a plurality of inputs for respectively receiving a plurality of said image data signals corresponding to said respectively associated portion of said array of image sensors, an output and means for switching signals from any of said inputs to said output.

5. The system of claim 4, wherein said inputs are coupled with an aligned set of image sensors defining said array portion.

6. The system of claim 1, wherein each of correction means includes;
   storage means for storing data representing a plurality of correction values; and
   means responsive to said processor for altering the values of the image data signals received by the corresponding correction means in accordance with the data stored in said storage means.

7. The system of claim 6, wherein said storage means includes first means for storing gain correction data and second means for storing offset correction data.

8. The system of claim 7, wherein said value altering means includes:
   first and second pluralities of resistive elements respectively defining differing resistive values;
   first and second switching means respectively coupled with said first and second pluralities of resistive elements;
   said first switching means being responsive to the data stored on first storing means for switching said image data signals through said first plurality of resistive elements,
   said second switching means being responsive to the data stored in said second storing means for switching a source of voltage into a circuit including said second plurality of resistive elements to thereby produce an offset voltage signal.

9. The system of claim 8, wherein said correction means includes means for combining the gain corrected signal with said offset voltage signal to produce a corrected output signal.

10. The system of claim 6, wherein each of said value altering means includes:
    a plurality of resistive elements respectively defining different resistive values, and
    switch means responsive to the data stored in said storage means for selectively switching certain of said resistive elements into circuit with the image data signals selected by said selection means.

11. An offset and gain correction system for correcting a plurality of image data signals produced by radiation-responsive image sensors, comprising:
    means for storing a plurality of gain correction values;
    means for storing a plurality of offset correction values;
    gain correction means coupled with said gain correction storage means for altering each of said plurality of image data signals by predetermined gain correction values stored in said gain correction storing means; and
    offset correction means responsive to said offset correction storage means for adding to each one of said plurality of gain corrected signals predetermined offset correction values stored in said offset correction storing means, to thereby provide a plurality of gain and offset corrected signals.

12. The system of claim 11, wherein said gain correction storing means and said offset correction storing means each include a digital memory.

13. The system of claim 11, including means for successively selecting each one of said signals from said plurality of signals.

14. The system of claim 13, including means for successively delivering each one of said plurality of gain and offset corrected signals to means for individually storing said signals.

15. The system of claim 11, wherein said gain correction means includes an analog amplifier having a plurality of selectable resistors responsive to any of said plurality of predetermined gain correction values such that said selected gain correction value defines a gain setting for said analog amplifier.

16. The system of claim 11, wherein said offset correction means comprises an analog summing circuit having a plurality of selectable summing resistors responsive to any of said plurality of predetermined offset correction values such that said selected offset correction value defines an offset value for said analog summer.

17. The system of claim 11, including digital processing means for transferring said gain correction values and said offset correction values respectively to said gain correction storing means and said offset correction storage means.

* * * * *

UNITED STATES PATENT AND TRADEMARK OFFICE
CERTIFICATE OF CORRECTION

PATENT NO. : 4,991,127

DATED : February 5, 1991

INVENTOR(S) : REX J. CROOKSHANKS

It is certified that error appears in the above-identified patent and that said Letters Patent is hereby corrected as shown below:

Column 6, line 44, at the equation change "v(t)" to $--v_2(t)--$ so that it reads as follows:

$$M(t) \propto v_1(t) \cdot q_1 + v_2(t) \cdot q_2$$

Column 7, lines 16 and 22, arrows not included in the equations. The equations should read:

$$\vec{V} = \vec{Aq}$$

where $\vec{V} = \begin{vmatrix} V(1) \\ \vdots \\ V(n) \end{vmatrix}$ and $\vec{q} = \begin{vmatrix} q^1 \\ \vdots_N \\ q^N \end{vmatrix}$ Column 7, line 31, the equation should read:

$$\vec{q} = A^{-1} \cdot \vec{V}$$

Column 17, line 27, change "=" (equal sign), second occurrence, to --x-- (multiplication sign).

UNITED STATES PATENT AND TRADEMARK OFFICE
CERTIFICATE OF CORRECTION

PATENT NO. : 4,991,127

DATED : February 5, 1991

INVENTOR(S) : Rex J. Crookshanks

It is certified that error appears in the above-identified patent and that said Letters Patent is hereby corrected as shown below:

Column 17, line 27, change "=" (equal sign), second occurrence, to --x-- (multiplication sign).

Signed and Sealed this

Fifteenth Day of June, 1993

Attest:

MICHAEL K. KIRK

Attesting Officer

Acting Commissioner of Patents and Trademarks